(12) United States Patent
Ajero et al.

(10) Patent No.: US 8,346,947 B2
(45) Date of Patent: Jan. 1, 2013

(54) DEVICE INITIATED MULTIPLE GRANTS PER INTERVAL SYSTEM AND METHOD

(75) Inventors: Don Philip Ajero, American Canyon, CA (US); Chih-Ping Lee, Cupertino, CA (US); Nan-Sheng Lin, Fremont, CA (US)

(73) Assignee: Innomedia Pte. Ltd., Singapore (SG)

( * ) Notice: Subject to any disclaimer, the term of this patent is extended or adjusted under 35 U.S.C. 154(b) by 194 days.

(21) Appl. No.: 12/930,984

(22) Filed: Jan. 21, 2011

(65) Prior Publication Data

US 2012/0047273 A1 Feb. 23, 2012

Related U.S. Application Data

(63) Continuation-in-part of application No. 12/806,755, filed on Aug. 20, 2010, now Pat. No. 8,233,475.

(51) Int. Cl.
*G06F 15/16* (2006.01)
*H04L 12/66* (2006.01)
*H04J 3/16* (2006.01)
(52) U.S. Cl. .......................... 709/228; 370/352; 370/467
(58) Field of Classification Search .................. 709/228; 370/352, 467
See application file for complete search history.

(56) References Cited

U.S. PATENT DOCUMENTS 6,807,193 B1 * 10/2004 Beser ........................... 370/498
7,760,739 B2 * 7/2010 Jung et al. ................ 370/395.21

OTHER PUBLICATIONS

Enterprise SIP Gateway Technical Report, Nov. 3, 2010, PacketCable, PKT-TR-ESG-V01-101103.*

* cited by examiner

*Primary Examiner* — Asad Nawaz
*Assistant Examiner* — Nicholas Jensen
(74) *Attorney, Agent, or Firm* — Timothy P O Hagan

(57) ABSTRACT

A cable modem integrated session border controller operates as a point of demarcation between a local area network (LAN) and a DOCSIS network and, in response to receiving a Session Initiation Protocol (SIP) message, which includes Session Description Protocol (SDP), from a VoIP device coupled to the LAN, communicates with a Cable Modem Termination System (CMTS) to take advantage of DOCSIS Dynamic Quality of Service (DQoS). If required service flow attributes, as determined from the SDP of the SIP message, matches service flow attributes of an existing UGS service flow with a CMTS, a DOCSIS Dynamic Service Change (DSC) request is used to add an additional sub flow to the existing UGS service flow. If attributes fail to match attributes of all existing UGS service flows, a DOCSIS Dynamic Service Change (DSC) request is used to initiate an additional UGS service flow with the required service flow attributes.

4 Claims, 17 Drawing Sheets

Figure 9

SIP Invite 34, 406

Local SDP (VoIP Device):
- Media Type 430
- Encoding Format 432
- Bandwidth 434
- Packetization Time 436

D: IP Address, Port (SS)

S: Local IP Address, Port (VoIP Device)

Remote SIP Address

Figure 10

Corresponding SIP Invite 44, 490

Local SDP (SBC):
- Media Type 430
- Encoding Format 432
- Bandwidth 434
- Packetization Time 436

D: IP Address, Port (SS)

S: Public IP Address, Port (SBC)

Remote SIP Address

Figure 11

SIP Invite 124 | Local SDP (Remote SDP): Media Type 430, Encoding Format 432, Bandwidth 434, Packetization Time 436 | D: Public IP Address, Port (SBC)
SIP Address of Device | S: IP Address, Port (SS)

Figure 12

Corresponding SIP Invite 134 | Local SDP (Local Agent SDP): Media Type 430, Encoding Format 432, Bandwidth 434, Packetization Time 436 | D: Local IP Address, Port (Device)
SIP Address of Device | S: Local IP Address, Port (SBC)

DEVICE INITIATED MULTIPLE GRANTS PER INTERVAL SYSTEM AND METHOD

TECHNICAL FIELD

The present invention relates to the management of Dynamic Quality of Service (DQoS) in a hybrid fiber/cable (HFC) network operating pursuant to the Data over Cable Service Interface Specification (DOCSIS), and more particularly for providing DQoS for a Voice over Internet Protocol (VoIP) device which lacks the ability to request DQoS allocation and commitment of resources from the Cable Modem Termination System (CMTS) managing resources within the HFC.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each telephone handset is coupled to a local switching station on a dedicated pair of copper wires known as a subscriber loop. When a telephone call is placed, the circuit is completed by dynamically coupling each subscriber loop to a dedicated pair of copper wires between the two switching stations.

Recently, voice telephone service has been implemented over the Internet. Advances in the speed of Internet data transmissions and Internet bandwidth have made it possible for telephone conversations to be communicated using the Internet's packet switched architecture. In one example, a cable service operator may include a multi-media terminal adapter (MTA) with one or more FXS ports embedded with the DOCSIS cable modem system and use a call management server (CMS) to provide telephone service using IP packets over the operator's hybrid fiber-coaxial (HFC) network.

A problem with use of the Internet's packet switch architecture is that when Internet traffic load is high, packets can be significantly delayed in router buffers or even dropped when router buffers "overflow". Packet delays and dropped packets significantly degrade audio quality of services (QOS)—well below audio QOS provided by the PSTN.

To improve the quality of service for audio calls with the goal of enabling cable service operators to provide reliable telephone service across their HFC networks, DOCSIS includes a Dynamic Service Flow scheme which dynamically provides dedicated bandwidth at predetermined time intervals to support a media session of a telephone conversation.

In an existing implementation utilizing CableLabs Packet-Cable 1.0/1.5, DQoS involves the CMS using Common Open Policy Service (COPS) protocol to communicate with the Cable Modem Termination System for resource reservation, and Network Control Signaling (NCS) to instruct the cable modem embedded with the MTA to utilize DOCSIS Dynamic Service Flow messages to request that the Cable Modem Termination System controlling the HFC network allocate and commit sufficient bandwidth, each being referred to as a service flow, for the media session of a telephone conversation.

More specifically, when the MTA detects that a telephone device coupled to one of its FXS ports is taken off hook, NCS signaling is used to notify the CMS of such an event. The CMS, communicates directly with the CMTS to reserve resources for the MTA and uses NCS signaling to instruct the MTA to create the connection and request allocation and commitment of bandwidth for the service flow via the embedded DOCSIS cable modem using DOCSIS Dynamic Service Flow messages.

Utilizing DOCSIS 2.0, up to 14 service flows may be active between an MTA and a CMTS. Utilizing DOCSIS 3.0, up to 24 service flows may be active between and MTA and a CMTS. Further, each of the 24 service flows may support multiple sub flows (also known as multiple grants per interval) with each sub flow supporting a distinct media session— so long as each media session utilizing a sub flow within the same service flow has common service attributes. There exists a maximum number of sub flows supported by DOCSIS 3.0.

In another existing implementation for non-NCS systems, the DQoS resource reservation and commitment are done by network based servers communicating directly with the CMTS under the CableLabs PacketCable Multimedia (PCMM) architecture.

As an advantage, a Cable Modem (CM) without MTA capability may support multiple VoIP devices on a local IP subnet (i.e. a Local Area Network). Each VoIP device may contact the network based server as part of setting up a VoIP session to another VoIP device. The network based server, as part of session set up, instructs the CMTS to establish a service flow (or a sub flow to an existing service flow) to support a media session of a VoIP telephone conversation.

A problem exists in that the DQoS mechanism described above is available only for devices wherein a CMS Server or network based servers in the PCMM architecture are available managing the reservation of bandwidth with the CMTS. DQoS is unavailable for non-NCS VoIP devices which either have an embedded DOCSIS cable modem or may be coupled to a local area network supported by a cable modem.

What is needed is a system and method that enables use of DQoS, including multiple grant per interval technology, by VoIP devices (whether embedded with the cable modem or coupled to the cable modem by a local area network) without requiring NCS messaging with a CMS server or the network infrastructure of PCMM.

SUMMARY OF THE INVENTION

A cable modem integrated session border control circuit operates as a point of demarcation between a local area network (LAN) and a DOCSIS network and, in response to receiving a Session Initiation Protocol (SIP) message, which includes Session Description Protocol (SDP), from a VoIP device coupled to the LAN, communicates with a Cable Modem Termination System (CMTS) to take advantage of DOCSIS Dynamic Quality of Service (DQoS) if a VoIP session between the VoIP device and a remote endpoint includes use of the DOCSIS network. The cable modem integrated session border controller further determines required service flow attributes. If required service flow attributes, as determined from the SDP of the SIP message, matches service flow attributes of an existing UGS service flow with a CMTS, a DOCSIS Dynamic Service Change (DSC) request is used to add an additional sub flow to the existing UGS service flow. If attributes fail to match attributes of all existing UGS service flows, a DOCSIS Dynamic Service Change (DSC) request is used to initiate an additional UGS service flow with the required service flow attributes.

In a first aspect, a DOCSIS cable modem system may be coupled to: i) a voice over internet protocol (VoIP) device operating Session Initiation Protocol (SIP) for signaling a VoIP media session; and ii) a CMTS via a DOCSIS network.

In this aspect, the cable modem system may comprise application layer gateway instructions stored in a memory and executed by a processor to: i) in response to receiving a frame via the local area IP network, determining if the frame is a Session Initiation Protocol (SIP) invite message signaling a VoIP session with a remote endpoint; and ii) in response to determining that the frame is a SIP invite message, generating a DOCSIS message to the CMTS to request an addition of reserved bandwidth on the DOCSIS network to potentially support a real time protocol (RTP) stream of the VoIP session.

The instructions may further include, in response to receiving a frame via the local area IP network, determining if the frame is a Session Initiation Protocol (SIP) OK message signaling commencement of the RTP stream between the VoIP device and the remote endpoint.

In response to determining that the frame is a SIP OK message, generating a DOCSIS message to the CMTS to request a change of reserved bandwidth on the DOCSIS network to: i) add an additional grant to an existing UGS service flow if the service flow parameters required for the VoIP session are the same as the service flow parameters of the existing UGS service flow and the existing UGS service flow can support an additional grant (i.e. it is not already at the maximum number of grants per interval available); and ii) commit reserved bandwidth as an additional UGS service flow for the VoIP session in the event either the service flow parameters required for the VoIP session fail to match the service flow parameters of the existing UGS service flow or the existing UGS service flow is already at its maximum number of grants.

The instructions may further yet include, in response to receiving a frame via the local area IP network, determining if the frame is a Session Initiation Protocol (SIP) BYE message signaling termination of a real time protocol stream between the VoIP device and the remote endpoint.

In response to determining that the frame is a SIP BYE message, generating a DOCSIS message to the CMTS, the DOCSIS message being: i) a dynamic service change (DSC) request to remove the grant supporting the RTP stream if the service flow supporting the RTP stream includes multiple grants per interval; and ii) a dynamic service deletion (DSD) request to delete the service flow if the service flow supporting the RTP stream includes only a single grant (i.e. the grant supporting the RTP stream).

In another aspect, the present invention comprises a session boarder control circuit (SBC). The CM/SBC is coupled to: i) a voice over internet protocol (VoIP) device via a local area network; and ii) an embedded cable modem circuit (CM) for communication with a cable modem termination system (CMTS) via a Data-Over-Cable Service Interface Specification (DOCSIS) network.

The SBC comprises, as instructions stored in a memory and executed by a processor, a back to back user agent system (B2BUA) embedded with a DOCSIS dynamic quality of service system (DQoS).

The B2BUA, in response to receiving a packet via the local area network, determines if the frame is a Session Initiation Protocol (SIP) invite message. In response to the B2BUA determining that the packet is a SIP invite message, the DQoS: i) generates a dynamic service addition Request message (DSA-REQ) to the CMTS; and ii) awaits a dynamic service addition response message (DSA-RSP) from the CMTS. The DSA-RSP being generated by the CMTS in response to the DSA-REQ if the CMTS allocates resources for the SBC. The B2BUA, only subsequent to the DQOS receiving the DSA-RSP, generates a corresponding SIP invite message to a SIP proxy. As such, the corresponding SIP invite message is only generated after the SBC has confirmed an allocation of bandwidth from the CMTS to support the potential call.

In response to the B2BUA receiving a SIP OK message from the SIP proxy the DQoS generates a dynamic service change request (DSC-REQ) to the CMTS to: i) add an additional grant to an existing UGS service flow if the service flow parameters required for the VoIP session are the same as the service flow parameters of the existing UGS service flow and the existing UGS service flow can support an additional grant (i.e. it is not already at the maximum number of grants per interval available); and ii) commit reserved bandwidth as an additional UGS service flow for the VoIP session in the event either the service flow parameters required for the VoIP session fail to match the service flow parameters of the existing UGS service flow or the existing UGS service flow is already at its maximum number of grants.

Thereafter, the DQoS awaits receiving a dynamic services change response message (DSC-RSP) from the CMTS.

The B2BUA, only subsequent to the DQoS receiving the DSC-RSP, generates a corresponding SIP OK message to the VoIP device via the local area network. As such, the corresponding SIP OK message is only generated after the SBC has confirmed a commitment of bandwidth from the CMTS to support the eminent call.

For a better understanding of the present invention, together with other and further aspects thereof, reference is made to the following description, taken in conjunction with the accompanying drawings. The scope of the present invention is set forth in the appended claims.

BRIEF DESCRIPTION OF THE DRAWINGS

FIG. 9 is a diagram representing an IP frame in accordance with an aspect of the present invention;

FIG. 10 is a diagram representing an IP frame in accordance with an aspect of the present invention;

FIG. 11 is a diagram representing an IP frame in accordance with an aspect of the present invention;

FIG. 12 is a diagram representing an IP frame in accordance with an aspect of the present invention;

DETAILED DESCRIPTION OF THE EXEMPLARY EMBODIMENTS

Figure 1:
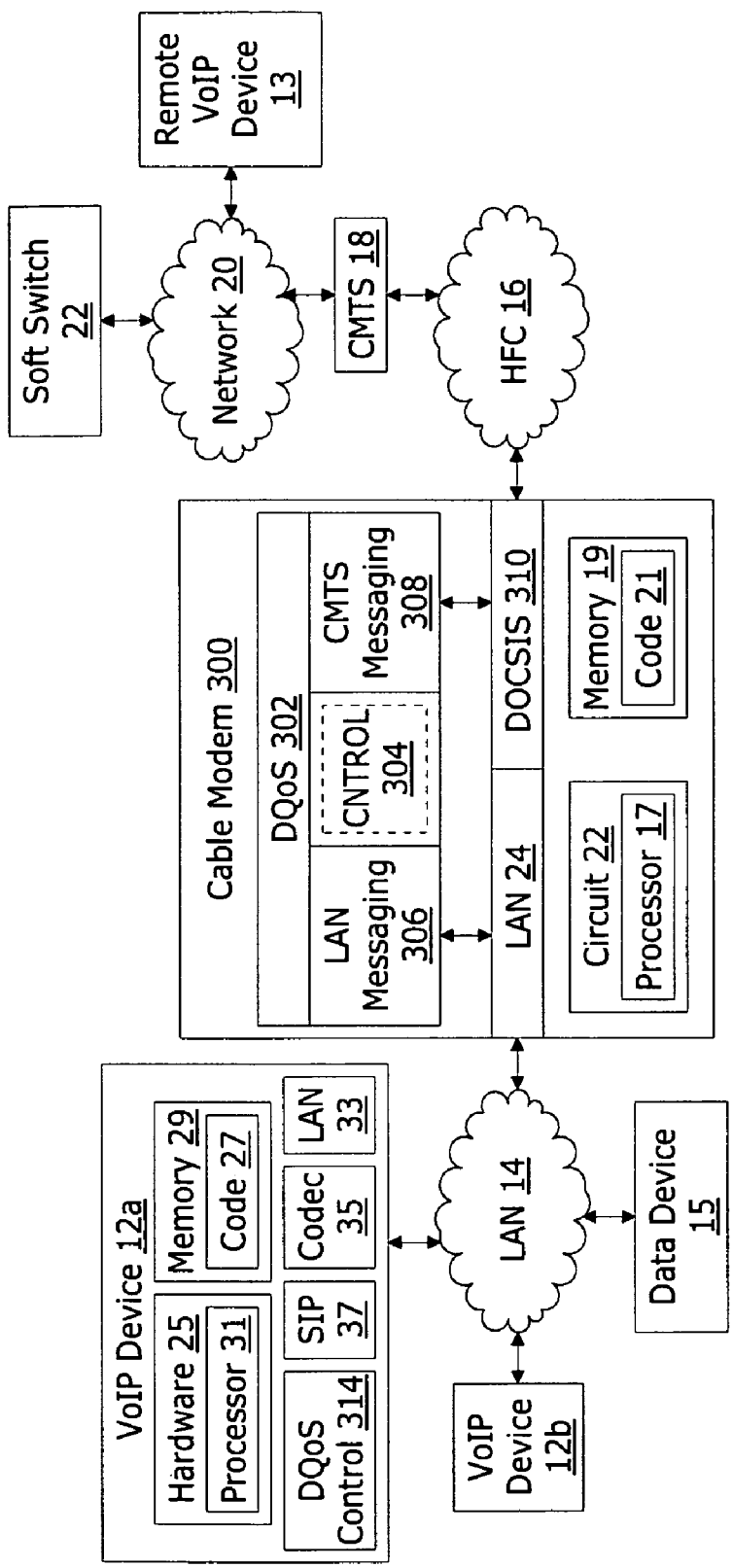
FIG. 1 is an architecture diagram representing an aspect of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements and systems discussed in this specification may be, or may be implemented in, a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

More specifically, with reference to FIG. 1, and without limiting the generality of the foregoing, each of the following elements of a Cable Modem 300 may be implemented as a combination of hardware circuits 22 and code 21 (i.e. processing steps) stored in a volatile or non-volatile memory 19 executed by the hardware circuits 22, inclusive of a processor 17: i) a Local Area Network (LAN) system 312, ii) a DOCSIS Cable Modem (CM) system 310; and iii) a Dynamic Quality of Service (DQoS) module 302. The DQoS module 302 may include LAN messaging 306, CMTS messaging 308, and optionally a control module 304.

The Cable Modem 300 may be coupled to a VoIP device 12a via a local area network (LAN) 14 and coupled to a Cable Modem Termination System (CMTS) via cable service provider's DOCSIS compliant Hybrid Fiber/Coax (HFC) network 16.

The LAN 14 may be a wired or wireless IP complaint network wherein all devices are assigned IP addresses within the domain of IP addressed assigned to local networks and which are un-routable over the Internet, for example 192.168.XXX.XXX. In an exemplary embodiment the Cable Modem 300 functions as a gateway for Internet traffic between devices coupled to the LAN 14 (including the VoIP device 12a and traditional data devices 15) and other IP devices coupled to other networks across the Internet.

An exemplary VoIP device 12a may include a traditional VoIP telephone or a traditional computer running a VoIP application. It should be appreciated that the VoIP device 12a is a non NCS device and a non PCMM device such that no external management server (i.e. a server coupled to the Internet with a publicly routable IP address for communication with managed VoIP devices) manages the reservation and commitment of bandwith or manages service flows for such VoIP device 12a. Without limiting the generality of the first and second paragraphs of this section (Detailed Description of the Exemplary Embodiments) or the previous sentence, each of the following elements of the VoIP device 12a may be implemented as a combination of hardware circuits 25 and code 27 (i.e. processing steps) stored in a volatile or non-volatile memory 29 executed by the hardware circuits 25, inclusive of a processor 31: i) a Local Area Network (LAN) system 33; ii) analog audio/CODEC system 35; iii) a Session Initiation Protocol (SIP) system 37; and iv) optionally a DQoS control system 314.

The LAN system 33 communicates IP frames with remote devices over the LAN 14 at all layers below the application layer. The SIP system 37 is an application which utilizes the Session Initiation Protocol to set up and tear down media sessions (i.e. Real Time Protocol (RTP) streams) for VoIP calls between the VoIP device 12a and a remote VoIP device (such as VoIP device 13) by exchanging SIP complaint messages with a remote SIP proxy server such as a Softswitch 22. The analog audio/CODEC system 35 converts between: i) analog audio input from a microphone and output by a speaker coupled to the VoIP device 12; and ii) compressed digital audio frames exchanged with the remote VoIP device 13 during the media session as an RTP stream.

The CMTS 18 is a traditional CMTS operating in compliance with DOCSIS to exchange data with the cable modem 300 (and each other cable modem) coupled to the HFC network 16—including operating in compliance with DQoS protocols to add, change, and delete dedicated bandwidth at dedicated intervals (i.e. resources) to assure audio quality in a VoIP session over the HFC network 16.

An example of adding dedicated or reserved bandwidth includes an allocation or reservation of bandwidth for a prospective RTP stream and the terms are used interchangeably throughout this application. The term bandwidth refers to availability of the network, or communication capabilities or bandwidth of the network for communication of a frame of a predetermined size, at predetermined intervals to support an RTP stream. Similarly, an example of changing dedicated bandwidth includes commitment of bandwidth (i.e. commitment of communication capabilities or bandwidth of the network at predetermined intervals) to support an imminent RTP stream and the terms are used interchangeably. An example of deletion of bandwidth includes releasing bandwidth at the end of an RTP stream and the terms are used interchangeably.

The Soft Switch 22 includes traditional Session Initiation Protocol (SIP) proxy functions for: i) receiving and forwarding SIP messages from a supported client (for example VoIP Device 12) to other SIP proxies (not shown) and/or a remote endpoint VoIP device 13 supported by the Soft Switch 22; and ii) receiving and forwarding SIP messages from other SIP proxies and/or a remote endpoint VoIP device 13 to the supported client (for example VoIP Device 12).

A network 20 comprises one or more IP complaint networks supporting the exchange of IP traffic between the CMTS 18 and each of the Soft Switch 22 and the remote VoIP device 13. The networks may include private backbones, such as a backbone network operated by the cable service provider, or Internet Service Provider (ISP) networks, and Internet backbone networks interconnected the networks of various ISPs.

In accordance with a first aspect of the present invention, the VoIP device 12a includes a DQoS control module 314 and DQoS (Dynamic Service Flow addition, change, and deletion of bandwidth reservation on the HFC network 16) is provided by the cable modem 300 in response to DQoS control by the VoIP device 12.

In accordance with a second aspect of the present invention, the cable modem 300 includes a DQoS control module 304 and DQoS (Dynamic Service Flow addition, change, and deletion of bandwidth reservation on the HFC network 16) is provided by the Cable Modem 300 in response to application layer gateway detection of SIP signaling between the VoIP device 12a and the Softswitch 22.

For either aspect, the cable modem 300 includes, as embedded components, the LAN System 312, the DOCSIS system 310, and the DQoS module 302. The DOCSIS system 310 is a traditional cable modem system operating in compliance with DOCSIS to exchange data over the HFC network 16 with the CMTS 18—including the relay of Common Open Policy Service (COPS) messages between the DQoS module 302 (which operates as the Policy Decision Point (PDP) for the VoIP device 12) and the CMTS 18 operating as the Policy Enforcement Point (PEP) for providing DQoS for the VoIP device 12.

Figure 2:
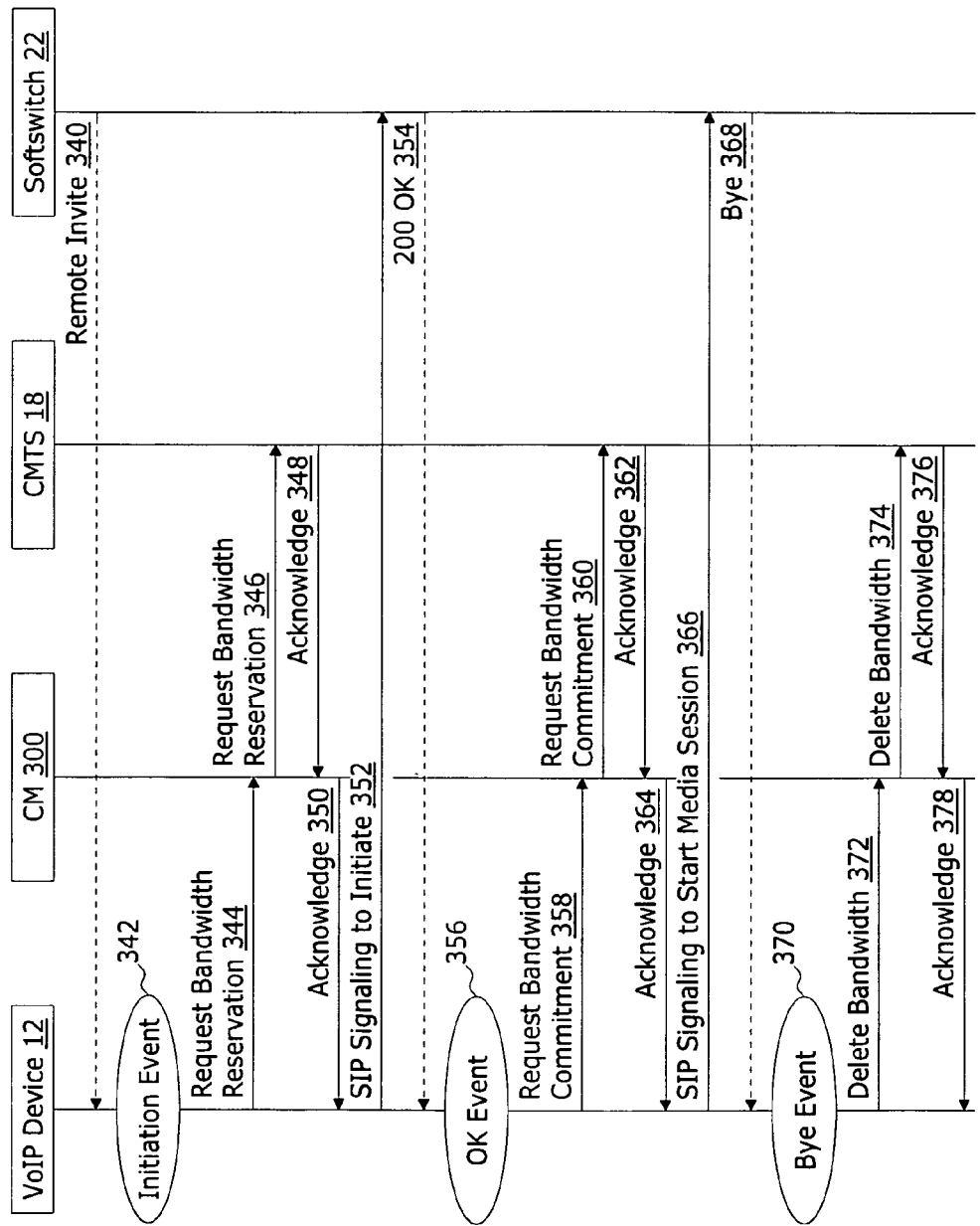
FIG. 2 is a ladder diagram representing signaling in accordance with an aspect of the present invention.

Referring to the ladder diagram of FIG. 2 in conjunction with FIG. 1, the first aspect of the invention wherein the VoIP device 12a includes a DQoS control module 314 for reserving, committing, and releasing bandwidth on the network 16 is represented.

The DQoS control module 314 of the VoIP device 12a sends a request bandwidth reservation message 344 to the LAN messaging module 306 of the DQoS module 302 of the Cable Modem 300 upon either receiving an Invite Message 340 from the Soft Switch 22 (indicating a remote caller calling into the VoIP Device 12) or upon an initiation event 342 occurring at the VoIP device 12a (such as the phone being taken off-hook).

In response to the request bandwidth reservation message 344, the CMTS messaging 308 of the DQoS module 302 of the cable modem 300 sends a request bandwidth reservation message 346 to the CMTS 18; the CMTS provides an acknowledgment 348 to the cable modem 300; and the cable modem 300 provides an acknowledgement 350 to the VoIP Device 12. Messages 344 and 350 may be IP messages routable on the local area network identifying, respectively, the request or the acknowledge. Messages 346 and 348 may be standard DOCSIS Mac layer messaging for reservation of dynamic service flows.

After receiving the acknowledgment 350, and only after receiving the acknowledgement 350 indicating that bandwidth has been reserved, the SIP module 37 of the VoIP device initiates the applicable SIP signal 352 to initiate the call. If the request for bandwidth 344 was in response to a remote invite message 340, the SIP message 352 may be a SIP Trying message if the bandwidth request was in response to receipt of a SIP invite from the soft switch 22. If the request for bandwidth 344 was in response to a local event 342, the SIP message 352 may be a SIP invite to the Soft Switch specifying a remote destination endpoint.

The DQoS control module 12a of the VoIP device 12a sends a request bandwidth change or commitment message 358 to the LAN messaging module 306 of the DQoS module 302 of the Cable Modem 300 upon either receiving a SIP 200 OK message 354 from the Soft Switch 22 (indicating a remote VoIP Device 13 is ready to commence a media session) or upon a local OK event 356 indicating that the VoIP device 12a is ready to commence a media stream (such as the person answering the telephone).

In response to the request bandwidth commitment message 358, the CMTS messaging 308 of the DQoS module 302 of the cable modem 300 sends a request bandwidth change or commitment message 360 to the CMTS 18; the CMTS provides an acknowledgment 362 to the cable modem 300; and the cable modem 300 provides an acknowledgement 364 to the VoIP Device. Messages 358 and 364 may be IP messages routable on the local area network. Messages 360 and 362 may be standard DOCSIS Mac layer messaging for reservation of dynamic service flows.

After receiving the acknowledgment 364, and only after receiving the acknowledgement 364 indicating that bandwidth has been committed for the RTP stream, the SIP module 37 of the VoIP device initiates the applicable SIP signal 366 to initiate the RTP stream. If the request for bandwidth commitment 358 was in response to a remote SIP OK message 354, the SIP message 366 may be a SIP ACK message. If the request for bandwidth commitment 358 was in response to a local Ok event 356, the SIP message 366 may be a SIP 200 OK message sent to the Soft Switch 22.

The DQoS control module 12a of the VoIP device 12a sends a request bandwidth deletion or release message 372 to the LAN messaging module 306 of the DQoS module 302 of the Cable Modem 300 upon either receiving SIP Bye message 368 from the Soft Switch 22 (indicating remote tear down of the RTP stream) or upon a local bye event 370 occurring at the VoIP device 12a (such as the phone being hung up).

In response to the request bandwidth deletion or release message 3372, the CMTS messaging 308 of the DQoS module 302 of the cable modem 300 sends a request bandwidth deletion message 374 to the CMTS 18; the CMTS provides an acknowledgment 376 to the cable modem 300; and the cable modem 300 provides an acknowledgement 378 to the VoIP Device. Messages 372 and 378 may be IP messages routable on the local area network. Messages 374 and 376 may be standard DOCSIS Mac layer messaging for DQoS deletion of bandwidth.

Figure 3:
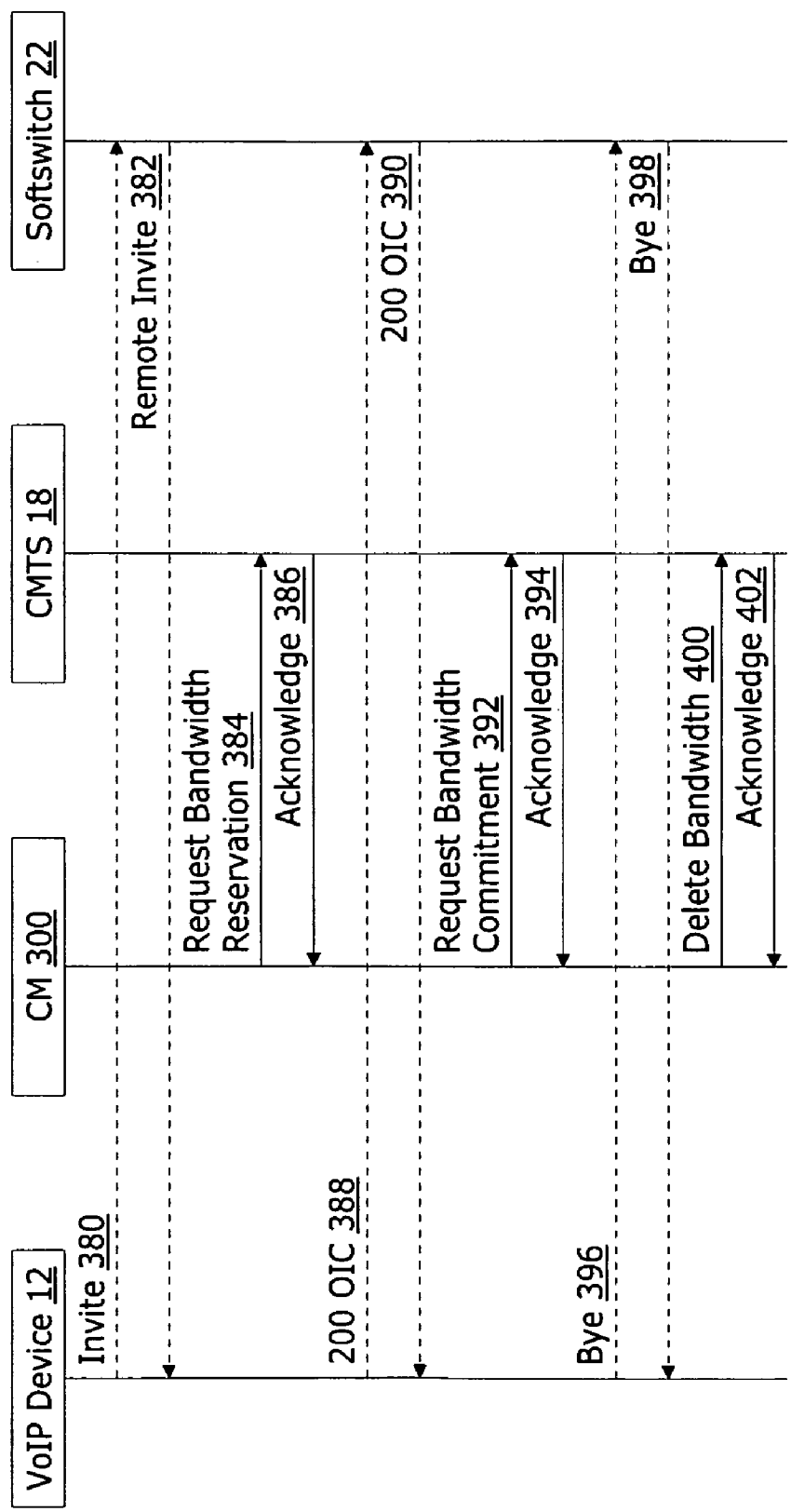
FIG. 3 is a ladder diagram representing signaling in accordance with another aspect of the present invention.

Referring to the ladder diagram of FIG. 3 in conjunction with FIG. 1, the second aspect of the invention is represented wherein the DQoS module 302 of the cable modem 300 includes a DQoS control module 304, including application layer gateway (ALG) functions, for recognizing SIP messaging between the VoIP 12a and the soft switch 22, and in response to detecting certain SIP messages, adding/reserving, changing/committing, and deleting/releasing bandwidth on the network 16 on behalf of the VoIP device 12.

For purposes of distinguishing ALG functionality from traditional NAT functionality, it should be appreciated that the NAT 27 only replaces source and destination IP address and port numbers in the headers of an IP frame when forwarding a frame, the substantive data (i.e. the payload) is not recognized or altered—simply re-addressed for routing. The term payload means the application level information content of a frame which remains unaltered when header information for lower layer systems (i.e. IP headers altered by the NAT server) are altered for purposes of transporting the application level information to its destination. The ALG compares the payload of the frame, at the application layer, to characteristics of the SIP messages to determine whether the frame is a SIP message, the type of SIP message, or data other than a SIP message.

The DQoS control module 304 of the cable modem 300 initiates a bandwidth addition or reservation message 384 to the CMTS 18 upon detecting that either the VoIP device 12a has sent a SIP Invite message 380 to the Soft Switch 22 or that the Soft Switch 22 has sent a SIP Invite message 382 to the VoIP device—in each case indicated that a VoIP call is to be set up. In response to the bandwidth addition or reservation message 384, the CMTS returns and acknowledgment 386. Messages 384 and 386 may be standard DOCSIS MAC layer messaging for addition or reservation of dynamic service flows.

The DQoS control module 304 of the cable modem 300 initiates a bandwidth change or commitment message 392 to the CMTS 18 upon detecting that either the VoIP device 12a has sent a SIP OK message 388 to the Soft Switch 22 or that the Soft Switch 22 has sent a SIP OK message 390 to the VoIP device—in each case indicating that an RTP stream in imminent. In response to the bandwidth change or commitment message 392, the CMTS returns and acknowledgment 394. Messages 392 and 394 may be standard DOCSIS Mac layer messaging for reservation of dynamic service flows.

The DQoS control module 304 of the cable modem 300 initiates a bandwidth deletion or release message 400 to the CMTS 18 upon detecting that either the VoIP device 12a has sent a SIP Bye message 396 to the Soft Switch 22 or that the Soft Switch 22 has sent a SIP Bye message 398 to the VoIP device—in each case indicating that reserved and committed bandwidth is no longer needed. In response to the bandwidth deletion message 400, the CMTS returns and acknowledgment 402. Messages 400 and 402 may be standard DOCSIS Mac layer messaging for reservation of dynamic service flows.

It should be appreciated that in the aspect described with respect to FIG. 2, wherein the VoIP device 12a controls reservation, commitment, and deletion of bandwidth, the VoIP device 12a may delay sending SIP messages until bandwidth has been appropriate reserved or committed. In the aspect describe with respect to FIG. 3, SIP messaging occurs between the VoIP device 12a and the Soft Switch 22 independent of the process used by the control module 304 to reserve and commitment dynamic service flows.

Figure 4:
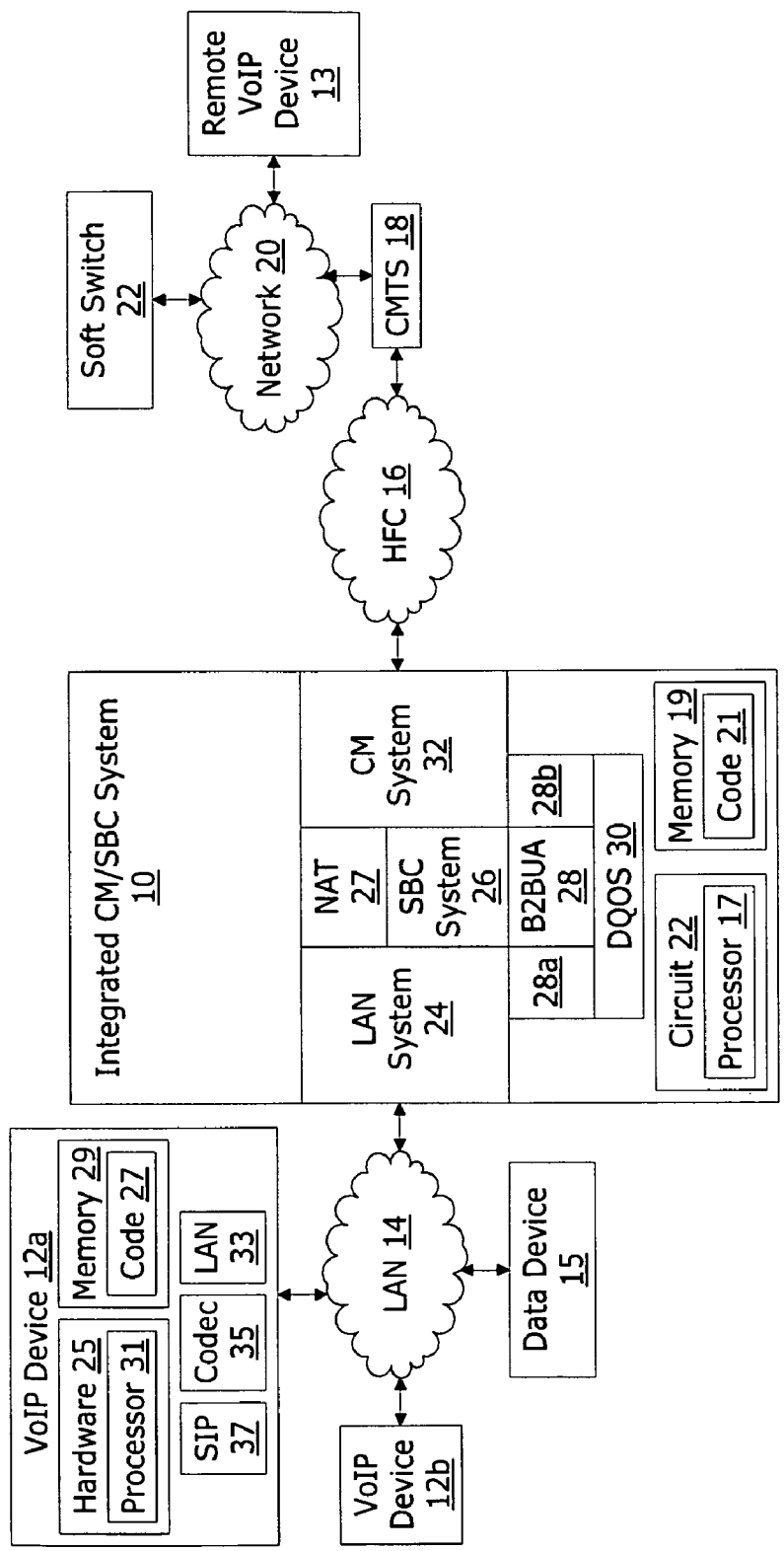
FIG. 4 is an architecture diagram representing yet another aspect of the present invention.

Referring to FIG. 4, in another aspect of the present invention, an integrated Cable Modem Session Border Controller (CM/SBC) may provide Dynamic Quality of Service (DQoS) for a Voice over Internet Protocol (VoIP) device 12: i) which is coupled to a local area network (LAN) 14 supported by the CM/SBC 10; and ii) which lacks the ability to request dynamic service flow allocation and commitment of resources from a Cable Modem Termination System (CMTS) 18 managing resources within a Hybrid Fiber/Cable (HFC) network 16 operating pursuant to the Data over Cable Service Interface Specification (DOCSIS). In this aspect, the CM/SBC utilizes a Back to Back User Agent (B2BUA) 28 to assure that bandwidth is reserved and committed prior to completing the SIP signaling to set up the RTP stream.

With reference to FIG. 4, each of the following elements of an integrated Cable Modem/Session Border Controller (CM/SBC) 10 may be implemented as a combination of hardware circuits 23 and code 21 (i.e. processing steps) stored in a volatile or non-volatile memory 19 executed by the hardware circuits 23, inclusive of a processor 17: i) a Local Area Network (LAN) system 24, ii) a Network Address Translation (NAT) system 27; iii) a Cable Modem (CM) system 32; and iv) a Session Border Controller (SBC) system 26. The SBC 26 includes a back-to-back user agent 28 (with a public user agent half 28b implemented back-to-back with a local user agent half 28a) and a DQoS module 30.

In accordance with an aspect of the present invention, Dynamic Quality of Service (DQoS) is provided by the CM/SBC for a Voice over Internet Protocol (VoIP) device 12: i) which is coupled to a local area network (LAN) 14 supported by the CM/SBC 10; and ii) which lacks the ability to request dynamic service flow allocation and commitment of resources from a Cable Modem Termination System (CMTS) 18 managing resources within a Hybrid Fiber/Cable (HFC) network 16 operating pursuant to the Data over Cable Service Interface Specification (DOCSIS). The VoIP device 12, the LAN 14, the HFC 16, the CMTS 18 and the Soft Switch 22, and network 20 are, in this aspect, similar to as described in previous aspects.

The CM/SBC 10 includes, as embedded components, the LAN System 24, the NAT Server 27, a cable modem system 32, the Session Border Control (SBC) system 26. The SBC 26 includes the back-to-back user agent 28 and the DQoS Module 30.

The CM 32 is a traditional cable modem system operating in compliance with DOCSIS to exchange data over the HFC network 16 with the CMTS 18—including the relay of Common Open Policy Service (COPS) messages between the DQoS module 30 (which operates as the Policy Decision Point (PDP) for the VoIP device 12) and the CMTS 18 operating as the Policy Enforcement Point (PEP) for providing DQoS for the VoIP device 12.

The NAT 27 is a traditional network address translation server which obtains an Internet routable IP address (the CM/SBC public IP address) from a DHCP server managed by the ISP operating the HFC network 16 and, for each outbound IP frame (i.e. a frame initiated by a device coupled to the LAN 14): i) stores the source IP address and port number of the frame in a record in the table; ii) replaces the source IP address and port number with the CM/SBC public IP address and an assigned port number and forwards the frame to the CM for communication over the HFC 16 and other networks comprising the Internet 20; and iii) records the assigned port number in the record in its NAT table such that it is associated with the source IP address and port number. For each inbound IP frame (i.e. a frame initiated by a remote device addressed to the CM/SBC public IP address): i) locates the record in the table with an assigned port number which matches the destination port number of the inbound frame; and iii) replaces the destination IP address and port number of the inbound frame with the source IP address and port number from the matching record; and ii) forwards such frame to the LAN system 24 for routing to its destination on the LAN 14.

For purposes of distinguishing the foregoing NAT functionality with the SBC system described herein, it should be appreciated that the NAT 27 only replaces source and destination IP address and port numbers in the headers of an IP frame when forwarding a frame, the substantive data (i.e. the payload) is not altered—simply re-addressed for routing. The SBC 26 intercepts and performs its functions based on the payload of a frame—even altering the payload of the frame such that the SBC 26 becomes the endpoint of a first VoIP session with the VoIP device 12a and an endpoint of a second, back to back, VoIP session with the remote VoIP device 13.

As discussed, the SBC 26 includes the B2BUA 28 and a DQoS module 30. The B2BUA 28 includes a local user agent half 28a back-to-backed with a public user agent half 28b for supporting VoIP sessions between the VoIP device 12a and a remote VoIP device 13 coupled to the Internet 20.

More specifically, the local user agent half 28a provides for set up (using SIP signaling) and maintenance of a local RTP stream for a local call segment with the VoIP device 12a across the LAN 14 and the public user agent half 28b provides for set up (using SIP signaling) and maintenance of a remote RTP stream for a remote call segment with the remote VoIP device 13 across the HFC 16 and Internet 20.

The DQoS module 30 obtains DQoS allocation and commitment of resources from the CMTS 18 for the remote call segment as a precondition to initiating the local and remote RTP streams.

Figure 5:
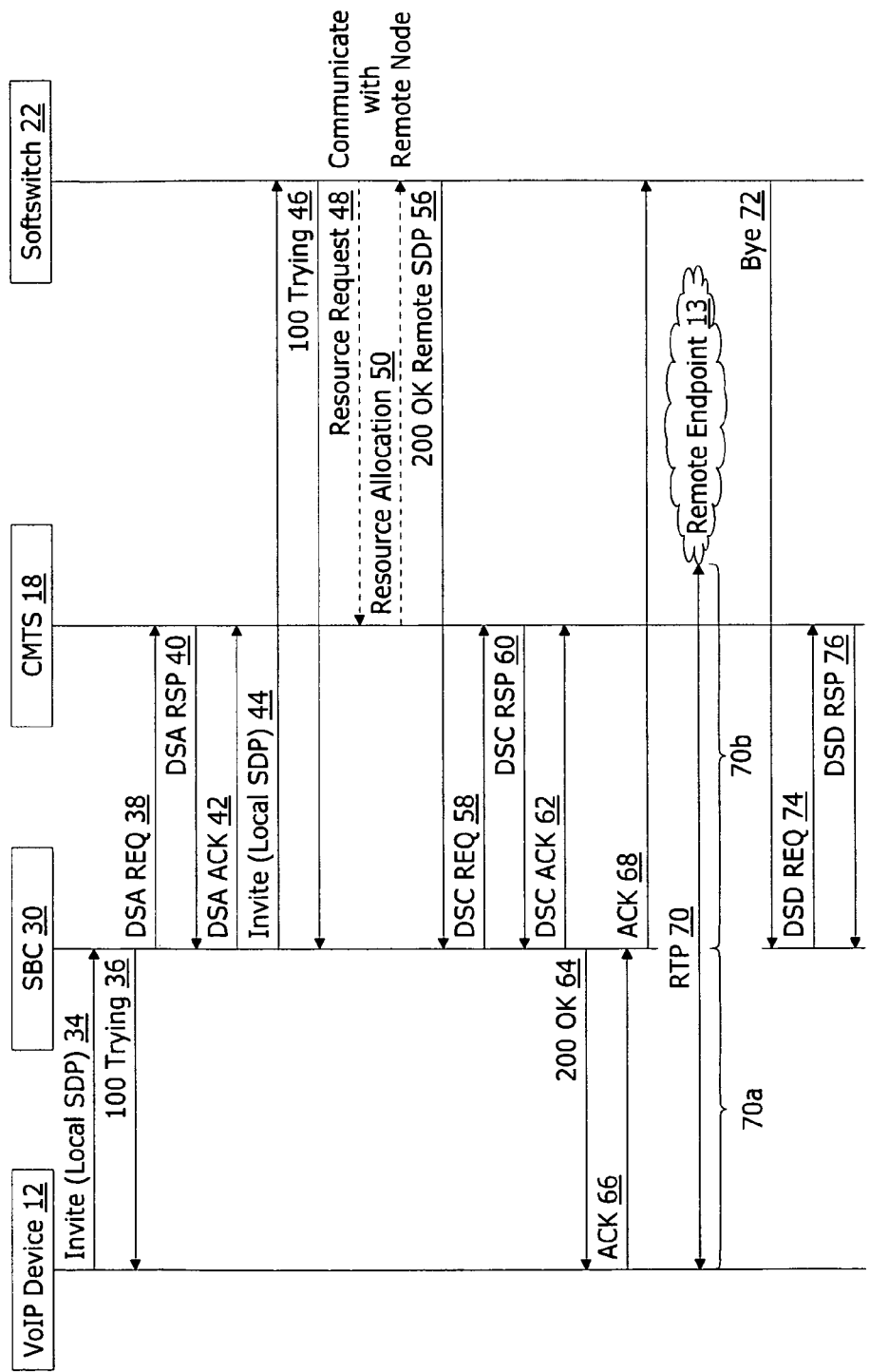
FIG. 5 is a ladder diagram representing signaling in accordance with an aspect of the present invention.
Figure 7:
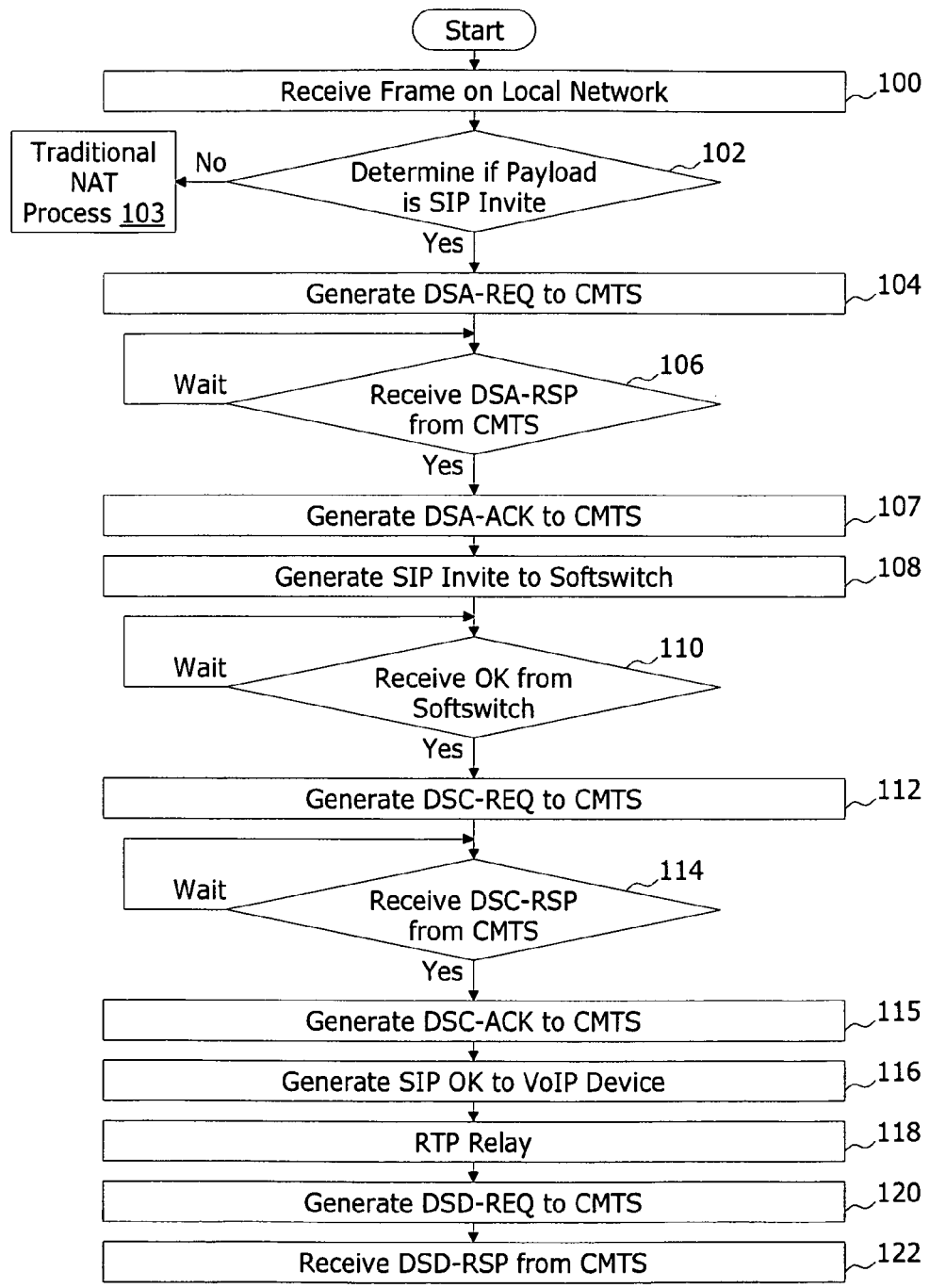
FIG. 7 is a flow chart representing exemplary operation of a session border controller in accordance with an aspect of the present invention.

FIG. 5 is a ladder diagram which represents signaling to set up an outbound RTP stream (i.e. and RTP stream initiated by the VoIP device 12a on the LAN 14) and the flow chart of FIG. 7 represents processing steps performed by the SBC 26 to initiate, receive, and otherwise perform such signaling as well as obtain DQoS allocation and commitment of resources.

Referring to FIG. 7 in conjunction with FIG. 5, step 100 of the flow chart represents the SBC 26 receiving an IP frame 33 (FIG. 9) with a payload comprising a SIP Invite message 34.

Turning briefly to FIG. 9, the frame 33 includes an IP header 35 which specifies a source IP address and port number of the VoIP device 12a and a destination IP address and port number of the Soft Switch 22. A payload 37 of the frame 33 includes the SIP invite message 34. The SIP invite message 34 includes specification of: i) the local Session Description Protocol (SDP) of the VoIP device 12; and ii) the SIP Address of the remote (i.e. intended) destination endpoint VoIP device 13.

The frame 33 is transmitted by the VoIP device 12a to the SBC 30 via the local area network 14 (FIG. 4)—which implicitly includes routing of the IP frame by the LAN System 24 to the CM/SBC operating as a gateway.

Although the ladder diagram of FIG. 5 represents a SIP invite message 34 within the payload 37 of the frame 33, the SBC also receives frames with payload other than a SIP invite message, for example frames with payloads of data from a data device 15 (FIG. 4). As such, step 102 of the flow chart represents the SBC 26 determining whether the frame 33 includes a SIP invite message 34 for example by comparing the payload 37 of the frame to characteristics of a SIP invite message.

If the frame 33 includes payload 37 other than a SIP invite message (or other SIP signaling), it may undergo traditional IP address and port translation by the NAT 27 for routing on the Internet as represented by step 103.

If the frame 33 includes payload 37 that is a SIP Invite message 34, the DQoS module 30 (FIG. 4) of the SBC 26, in response to determining that the frame 33 includes a SIP invite message 34, generates, a dynamic services addition Request (DSA-REQ) message 38 to the CMTS 18 as represented by step 104 of the flow chart. The local user agent half 28a of the B2BUA 28 may also send a SIP 100 Trying message 36 to the local VoIP device 12.

Step 106 of the flow chart represents the SBC 26 waiting to receive, and receiving, a dynamic services addition response (DSA-RSP) message 40 from the CMTS 18.

In response to receiving the DSA-RSP 40, the SBC 26 generates a dynamic services addition Acknowledge (DSA-ACK) message 42 to the CMTS 18 as represented by step 107 of the flow chart.

Each of the DSA-REQ 38, the DSA-RSP 40, and the DSA-ACK 42 may be COPS messages with the DQoS module operating as the PDP for the VoIP device 12a and the CMTS operating as the PEP.

Also in response to receiving the DSA-RSP 40, and only after receiving the DSA-RSP 40, the public user agent half 28b of the B2BUA 28 of the SBC 26 generates a IP frame 43 (FIG. 10) with a payload 47 (FIG. 10) comprising a corresponding SIP Invite message 44 (FIG. 5) to the Soft Switch 22 as represented by step 108 of the flow chart.

Referring briefly to FIG. 10, the frame 43 includes an IP header 45 which specifies a source IP address and port number of the SBC 30 (i.e. the CM/SBC public IP address assigned by the Internet Service Provider) and a destination IP address and port number of the Soft Switch 22. The payload 47 of the frame 43 includes the corresponding SIP invite message 44. The corresponding SIP invite message 44 includes specification of: i) the local Session Description Protocol (SDP) of the B2BUA 28 of the SBC system 25; and ii) the SIP Address of the remote (i.e. intended) destination endpoint VoIP device 13.

The frame 43 with the corresponding SIP Invite message 44 is transmitted by the B2BUA 28 to the Soft Switch 22 via the HFC network 16 and the network 20 as represented by step 108.

In response to receiving the corresponding SIP Invite message, the Softswitch may generate a SIP 100 Trying message 46 back to the B2BUA 28, communicate the a remote node such as a proxy server supporting the remote endpoint 13 to obtain a remote SDP of the remote endpoint 13, and, if needed obtain allocation of bandwidth for the remote endpoint by, for example, requesting recourse allocation from a CMTS 18 (message 48) and obtaining allocation (message 50). These steps are useful in a system wherein a CMTS will not allocate bandwidth to a cable modem unless a gate ID has been assigned by the CMTS. Requesting and obtaining resource allocation includes obtaining a gate ID to return to the B2BUA.

Returning to the flow chart, step 110 represents the B2BUA 28 waiting for, and receiving a SIP 200 OK message 56 with a remote SDP from the Soft Switch 22.

In response to receiving the SIP 200 OK message 56, and only after receiving the SIP 200 OK message 56, the DQoS module 30 of the SBC 26 generates a dynamic services change Request (DSC-REQ) message 58 to the CMTS 18 as represented by Step 112.

Step 114 of the flow chart represents the SBC 26 waiting to receive, and receiving, a dynamic services change response (DSC-RSP) message 60 from the CMTS 18.

In response to receiving the DSC-RSP 60, and only after receiving the DSC-RSP 60, the DQoS module 30 generates a dynamic services change Acknowledge (DSC-ACK) message 62 to the CMTS as represented by step 115 of the flow chart and the local user agent half 28a of the B2BUA 28 generates a 200 SIP OK message 64 to VoIP device 12a via the local area network 14 as represented by step 116 of the flow chart.

Thereafter, after appropriate acknowledge messages, at least some of which are represented on the ladder diagram by reference numerals 66 and 68, the real time protocol (RTP) stream 70 is commenced.

The RTP stream 70 comprises at least a first segment 70a and a second segment 70b. The first segment 70a is a RTP stream between the VoIP device 12a and a local user agent half 28a of the B2BUA 28 using the SDP of the VoIP device and the SDP of the local user agent half 28a of the B2BUA 28. The second segment 70b represents an RTP stream between a public user agent half 28b of the B2BUA 28 and the remote VoIP device 13 using the SDP of the public user agent half 28b of the B2BUA 28 and the SDP of the VoIP device 13.

Thereafter, in response to the B2BUA receiving a SIP Bye message, the committed bandwidth on the HFC network 16 is release by the DQoS module 30 transmitted a dynamic services deletion request (DSD-REQ) message 74 to the CMTS 18 as represented by step 120 of the flow chart and CMTS returning a dynamic service deletion response (DSD-RSP) message 76 for receipt by the DQoS module 30 as represented by step 122.

Figure 13:
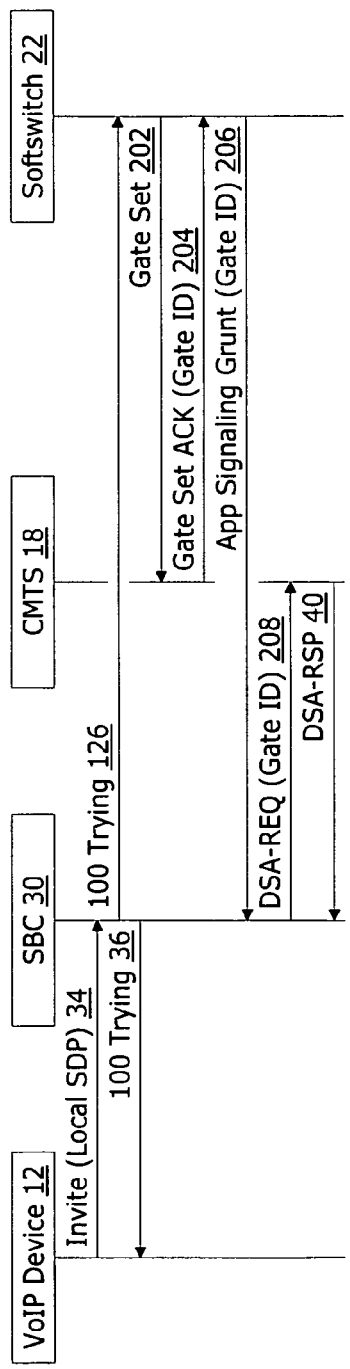
FIG. 13 is a ladder diagram representing signaling in accordance with yet another aspect of the present invention.
Figure 14:
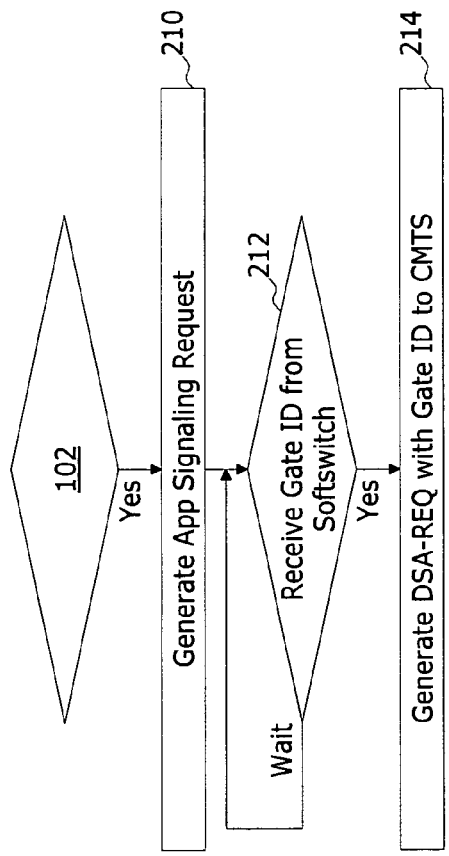
FIG. 14 is a flow chart representing exemplary operation of a session border controller in accordance with yet another aspect of the present invention.

Referring briefly to messaging of the ladder diagram of FIG. 13 and the flow chart of FIG. 14, in accordance with one aspect of the invention, additional steps may be performed to obtain a gate ID.

The additional steps are performed after receipt of the Invite message 34 as described with respect to FIGS. 5 and 7. Upon receipt of the Invite message 34, the public user agent half 28b of the B2BUA 28 generates an application signaling request 35 to the Softswitch 22 as represented by step 210 of the flow chart.

In response to receiving the application signaling request 35, the Softswitch 22 generates a Gate Set message 202 to the CMTS 18 and receives a Gate Set Acknowledge message 204 in response. The Gate Set Acknowledge message 204 includes a DQoS Gate ID assigned by the CMTS.

After receiving the Gate Set Acknowledge message 204, the Softswitch 22 returns an Application Signaling Grant message 206, which includes the Gate ID to the SBC 30. Step 212a of the flow chart represents the B2BUA 28 waiting for, and receiving, the Application Signaling Grant message 206 from the Softswitch 22.

In response to receiving the Application Signaling Grant message 206, and only after receiving the Application Signaling Grant message 206, the DQoS module 30 generates a DSA-REQ message 208, which includes the Gate ID, to the CMTS as represented by step 214 of the flow chart.

Step 214 and DSA-REQ 208 are the same as Step 104 (FIG. 7) and DSA-REQ 38 (FIG. 5) with the exception that the DQoS module includes the Gate Id in DSA-REQ 208 at step 214. Thereafter, the process continues as described with respect to FIG. 5 and FIG. 7.

Inbound Call

Figure 6:
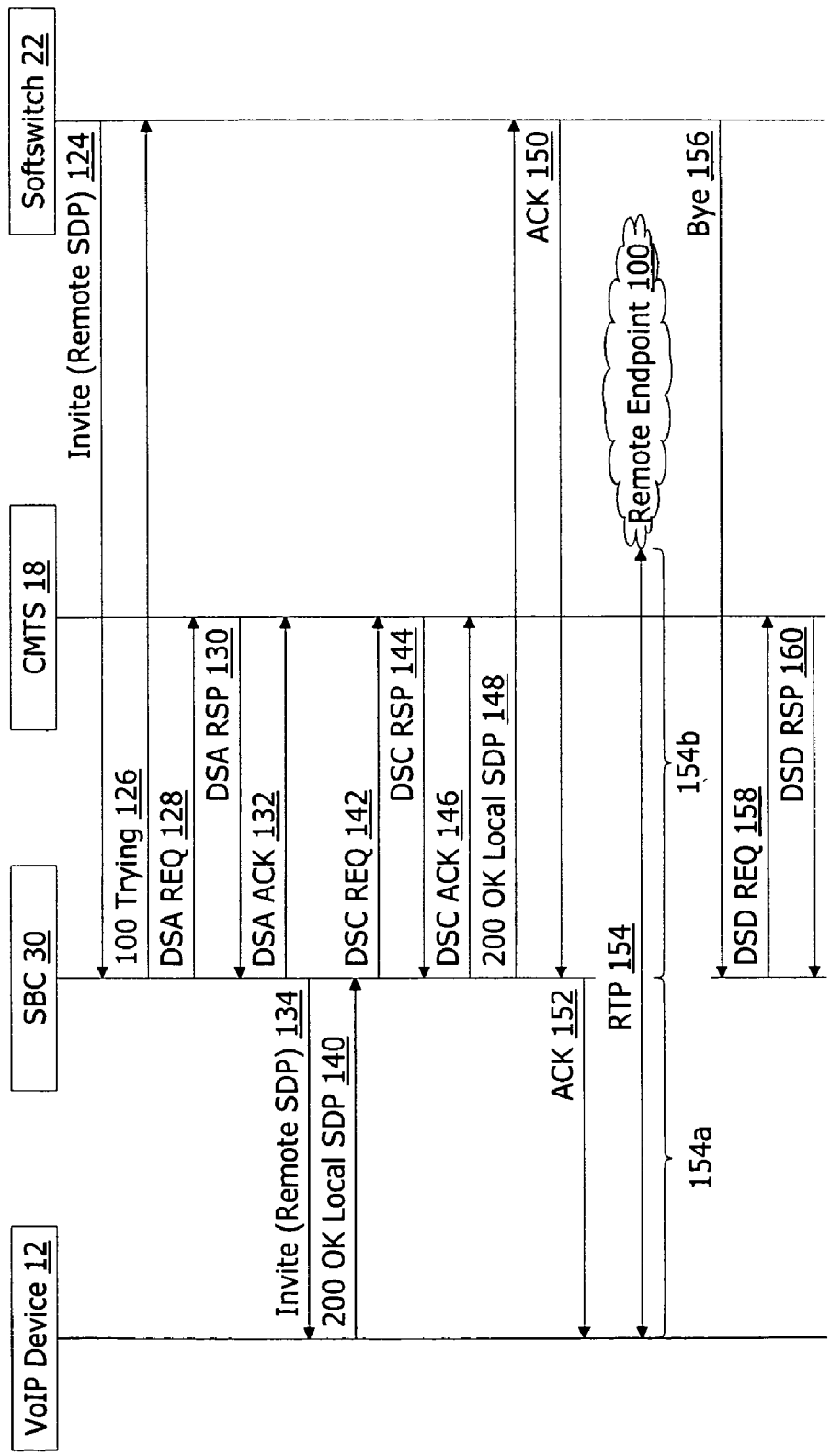
FIG. 6 is a ladder diagram representing signaling in accordance with another aspect of the present invention.
Figure 8:
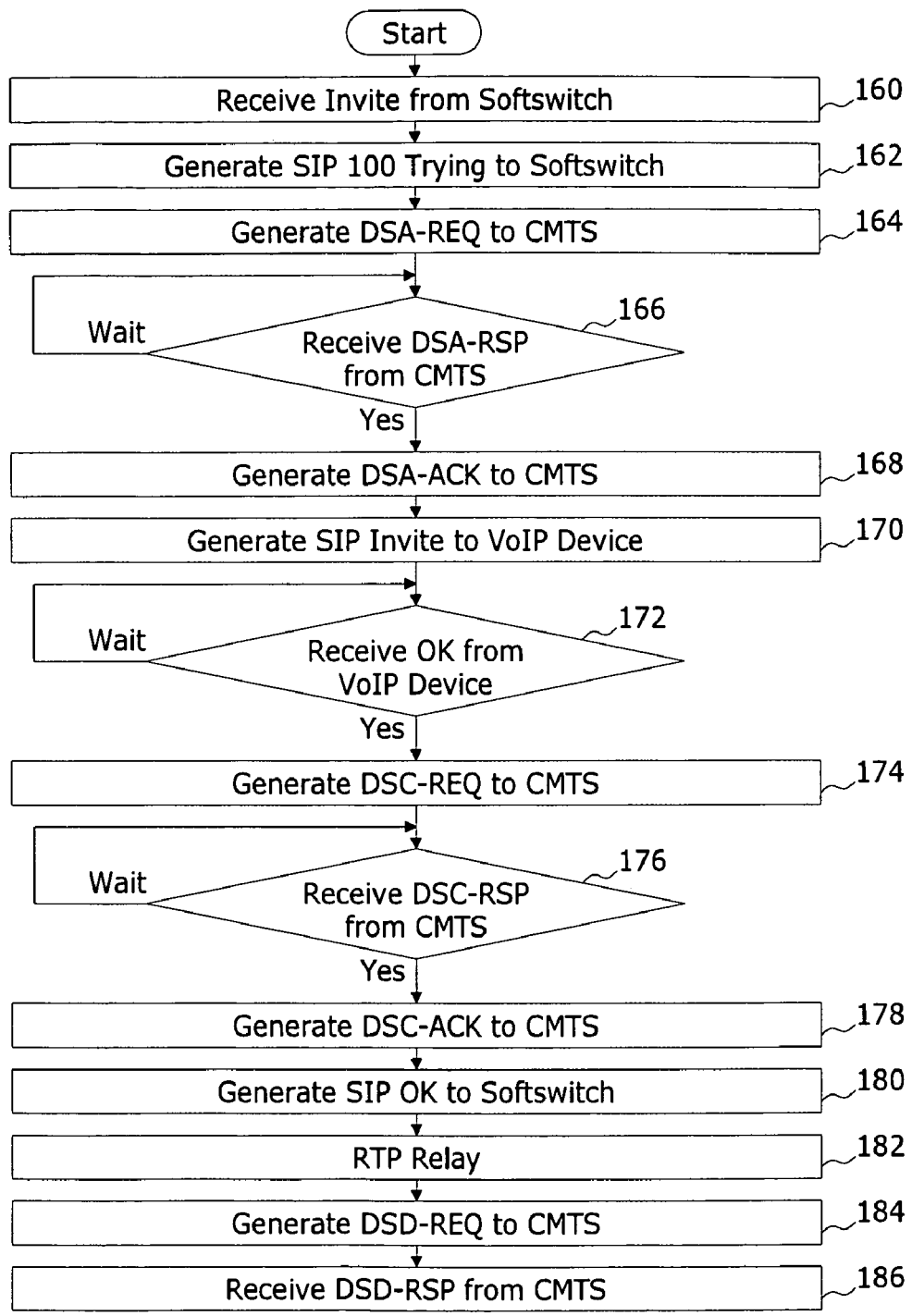
FIG. 8 is a flow chart representing exemplary operation of a session border controller in accordance with another aspect of the present invention.

FIG. 6 is a ladder diagram representing signaling to set up an inbound RTP stream (i.e. and RTP stream initiated by a remote VoIP device, such as device 13, to the VoIP device 12a on the LAN 14) and the flow chart of FIG. 8 represents steps performed by the SBC 26 to initiate, receive, and otherwise perform such signaling.

Referring to FIG. 8 in conjunction with FIG. 6, step 160 of the flow chart represents the SBC 30 receiving an IP frame 190 (FIG. 11) with a payload comprising a SIP Invite message 124.

Turning briefly to FIG. 11, the frame 190 includes an IP header 192 which specifies a source IP address and port number of the Soft Switch 18 and a destination IP address and port number of the SBC 30. A payload 191 of the frame 190 includes the SIP invite message 134. The SIP invite message 124 includes specification of: i) the remote Session Description Protocol (SDP) of the initiating device (remote VoIP device 13); and ii) the SIP Address of the destination endpoint which, because the VoIP device 12a is on a local area network, is the SIP address of the public user agent half 28b of the B2BUA 28 (i.e. the public IP address of the SBC 30).

In response to receiving the SIP Invite: i) the public user agent half 28b of the B2BUA 28 generates a SIP 100 trying message to the Soft Switch 22 as represented by step 162 of the flow chart; and ii) the DQoS module 30 (FIG. 4) of the SBC 26, generates a dynamic services addition Request (DSA-REQ) message 128 to the CMTS 18 as represented by step 162 of the flow chart.

Step 166 of the flow chart represents the SBC 26 waiting to receive, and receiving, a dynamic services addition response (DSA-RSP) message 40 from the CMTS 18.

In response to receiving the DSA-RSP 40, the SBC 26 generates a dynamic services addition Acknowledge (DSA-ACK) message 132 to the CMTS 18 as represented by step 168 of the flow chart.

Again, each of the DSA-REQ 38, the DSA-RSP 40, and the DSA-ACK 42 may be COPS messages with the DQoS module 30 operating as the PDP for the VoIP device 12a and the CMTS operating as the PEP.

Also in response to receiving the DSA-RSP 130, and only after receiving the DSA-RSP 130, the local user agent half 28a of the B2BUA 28 generates an IP frame 193 (FIG. 12) with a payload 194 comprising a corresponding SIP Invite message 134 (FIG. 6) to the VoIP device 12a as represented by step 170 of the flow chart.

Referring briefly to FIG. 12, the frame 193 includes an IP header 195 which specifies a source IP address (i.e. local IP address of SBC) and port number of the local user agent half 28a of the B2BUA 28 and a destination local IP address and port number of the VoIP Device. The payload 194 of the frame 193 includes the corresponding SIP invite message 134. The corresponding SIP invite message 134 includes specification of: i) the Session Description Protocol (SDP) of the local user agent half 28a of the B2BUA 28; and ii) the local SIP Address of the VoIP device 12.

Step 172 represents the B2BUA 28 waiting for, and receiving a SIP 200 OK message 140 with a Session Description Protocol (SDP) from the local VoIP device 12.

In response to receiving the SIP 200 OK message 140, and only after receiving the SIP 200 OK message 140, the DQoS module 30 of the SBC 26 generates a dynamic services change Request (DSC-REQ) message 142 to the CMTS 18 as represented by Step 174.

Step 176 of the flow chart represents the SBC 26 waiting to receive, and receiving, a dynamic services change response (DSC-RSP) message 144 from the CMTS 18.

In response to receiving the DSC-RSP 144, and only after receiving the DSC-RSP 144, the DQoS module 30 generates a dynamic services change Acknowledge (DSC-ACK) message 146 the CMTS as represented by step 178 of the flow chart and the B2BUA 28 generates a 200 SIP OK message 148 to the Soft Switch 22 as represented by Step 180 of the flow chart.

Thereafter, after appropriate acknowledge messages, at least some of which are represents on the ladder diagram by reference numerals 150 and 152, the real time protocol (RTP) stream 154 is commenced.

The RTP stream 154 comprises at least a first segment 154a and a second segment 154b. The first segment 154a is a RTP stream between the VoIP device 12a and a local user agent half 28a of the B2BUA 28 using the SDP of the VoIP device and the SDP of the local user agent half 28a of the B2BUA 28. The second segment 154b represents a RTP stream between a public user agent half 28b of the B2BUA 28 and the remote VoIP device 13 using the SDP of the public user agent half 28b of the B2BUA 28 and the SDP of the VoIP device 13.

Thereafter, in response to the B2BUA receiving a SIP Bye message, the committed bandwidth on the HFC network 16 is release by the DQoS module 30 transmitted a dynamic services deletion request (DSD-REQ) message 158 to the CMTS 18 as represented by step 184 of the flow chart and CMTS returning a dynamic service deletion response (DSD-RSP) message 160 for receipt by the DQoS module 30 as represented by step 186.

CIP Material

In another aspect of the present invention, referring again to FIG. 4, reservation and commitment of bandwidth, in the form of either commencing a new UGS service flow for a VoIP call between a VoIP device 12a and a remote VoIP device or adding an additional sub-flow to an existing UGS service flow, is performed by the cable modem integrated session border controller 10—in response to events initiated by the VoIP device 12a and not under control of a remote server such as a PCMM server.

Similarly, this aspect of the invention related to multiple grants per interval technology may be implemented in the cable modem 300 as depicted in FIG. 1 in the embodiment wherein the DQoS module 302 includes the DQoS control module 304.

Figure 15:
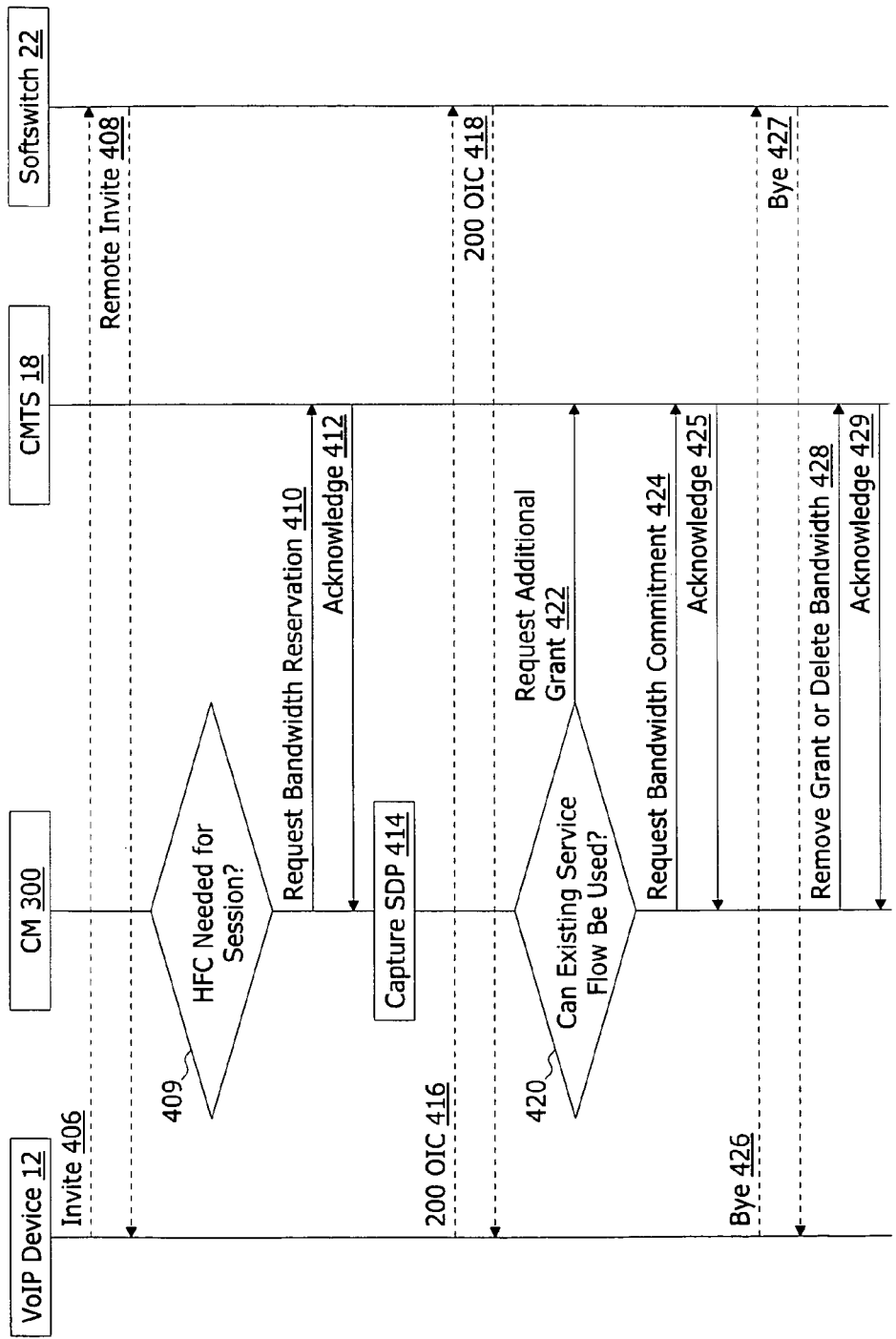
FIG. 15 is a ladder diagram representing signaling in accordance with a multiple grant per interval an aspect of the present invention.

More specifically, referring to the ladder diagram of FIG. 15 in conjunction with FIG. 1, an aspect of the invention is represented wherein the DQoS module 304, and more specifically, the application layer gateway (ALG) function, further implements multiple grants per interval technology in a situation where in multiple VoIP devices 12a and 12b are present on the LAN 14, each involved in set up of a VoIP session with a remote VoIP device, such as remote VoIP device 13. For purposes of illustrating this aspect of the invention, it is assumed that VoIP device 12b has an active VoIP media session, utilizing a DQoS service flow, with a remote endpoint which was set up as described in this application.

Upon detecting that either the VoIP device 12a has sent a SIP Invite message 406 to the Soft Switch 22 or that the Soft Switch 22 has sent a SIP Invite message 408 to the VoIP device 12a—in each case indicating that a VoIP call is to be set up, the DQoS control module 304 of the cable modem 300 determines whether the session will require bandwidth on the HFC network 16 at step 409. This determination may require determining whether both the VoIP device 12 and the remote VoIP device with which the session will take place are both on the LAN 14. If yes, the VoIP session will not require use of the HFC network and reservation and commitment of bandwidth (i.e. establishing a DOCSIS service flow will not be needed).

Alternatively, if the remote VoIP device is coupled to the Internet 20 (or a remote subnet) then a service flow (or a sub-flow within an existing service flow) over the HFC is required. In which case, the DQoS control module 304 initiates a bandwidth addition or reservation message 410 to the CMTS 18. Essentially the DQoS control module 304 is a trusted device in that the CMTS 18 is configured to permit the DQoS control module to reserve bandwidth in the absence of a PCMM server or other internet based server communicating directly with the CMTS to authorize the reservation of bandwith. Bandwith is reserved in response to the SIP Invite message because, at the time of receipt of the SIP Invite message, the DQoS control module 304 does not have sufficient information to determine whether the session can utilize a sub-flow on an existing service flow or whether a new service flow will be required.

In response to the bandwidth addition or reservation message 410, the CMTS returns an acknowledgment 412. Messages 410 and 412 may be standard DOCSIS MAC layer messaging for addition or reservation of dynamic service flows.

Step 414 represents the DQoS module 304 obtaining Session Description Protocol (SDP) parameters from at least one of the SIP Invite messages 406, 408. Referring again briefly to FIG. 8 in conjunction with FIG. 15, the SIP invite message 406 may be embodied in a frame 33 which includes an IP header 35 which specifies a source IP address and port number of the VoIP device 12a and a destination IP address and port number of the Soft Switch 22. A payload 37 of the frame 33 includes the SIP invite message 34. The SIP invite message 34 includes specification of: i) the local Session Description Protocol (SDP) of the VoIP device 12; and ii) the SIP Address of the remote (i.e. intended) destination endpoint VoIP device, such as VoIP device 13. The SDP parameters may include at least: i) identification of media type (i.e. VoIP audio media) 430; ii) an encoding format (commonly referred to as identification of a CODEC) 432; iii) bandwidth parameters identifying one of maximum or minimum bandwidth requirements 434; and iv) packetization time 436—meaning the rate at which VoIP packets are periodically generated.

These SDP parameters may be buffered or stored by the DQoS module 304 while the VoIP device 12a continues to exchange SIP messages with the Softswitch 22 for call set up.

Returning to FIG. 15, either: i) the VoIP device 12a may provide a SIP OK message 416 to the Soft Switch 22; or ii) the Soft Switch 22 pay provide a SIP OK message 418 to the VoIP device 12a—in each case indicating that commencement of the media session (i.e. an RTP stream) is imminent.

Step 420 represents determining whether an existing DQoS service flow (for example the service flow in use for a media session of a VoIP call between VoIP device 12b and a remote endpoint) may be used for the commencing media session between the VoIP device 12a and the remote endpoint. Or, stated another way, whether an additional sub flow may be added to an existing unsolicited grant (UGS) service flow.

Figure 16:
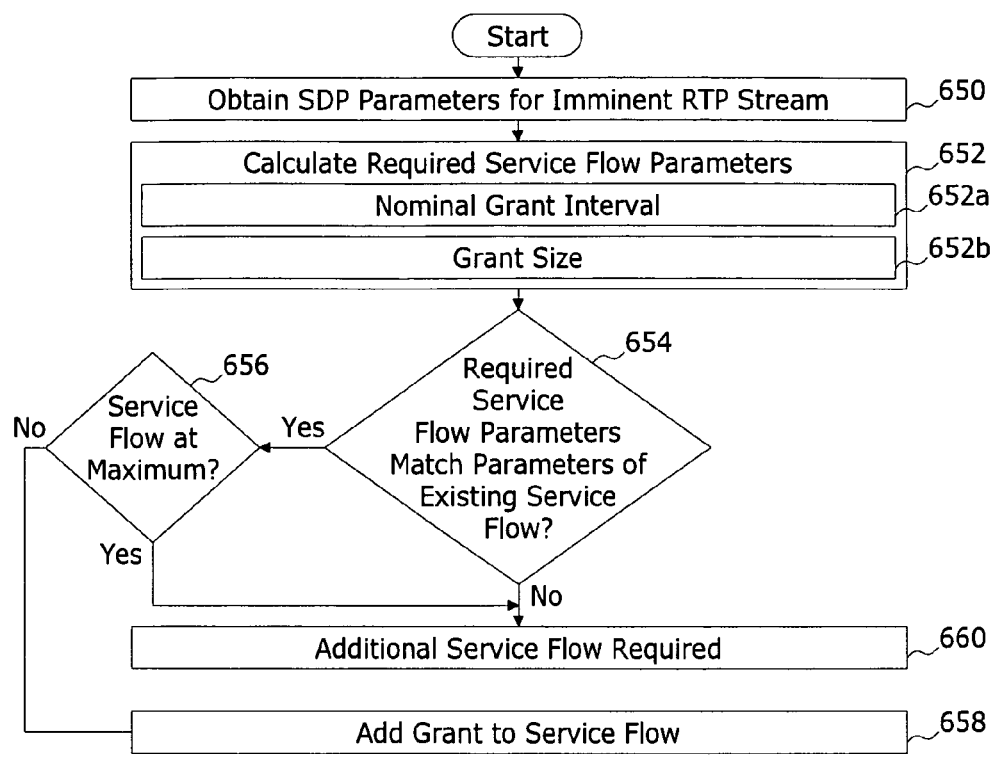
FIG. 16 is a flow chart representing a DQoS module determining whether an additional grant per interval may be added to an existing service flow in accordance with an aspect of the present invention.

More particularly, referring briefly to FIG. 16, step 650 represents the DQoS module 304 obtaining the SDP parameters for the imminent RTP stream. These SDP parameters may be the SDP parameters captured from at least one of the SIP Invite messages 406, 408 at step 414—and stored or buffered until needed by this step 650.

Step 652 represents calculating the service flow parameters required to support the imminent RTP stream. The service flow parameters may include a nominal grant interval parameter—which is the rate at which grants are available for packet transmission. The nominal grant interval parameter is calculated at step 652a. The service flow parameters may also include a grant size parameter—which is the duration of time each periodic grant is available for packet transmission. The grant size parameter is calculated at step 652b.

Step 654 represents determining whether the required service flow parameters calculated at step 652 match the service flow parameters of the existing UGS service flow (i.e. the service flow supporting an existing RTP stream such as a media session between the VoIP device 12b (FIG. 1) and a remote VoIP device). If the service flow parameters do not match, the existing UGS service flow cannot be used and the determination is made that an additional UGS service flow is required at step 660.

If the service flow parameters do match, then at step 656 the DQoS module 304 determines whether an additional sub flow can be added to the existing UGS service flow—i.e. whether an additional duration of time can be added to each interval of availability for packet transmission. There exist a maximum number of sub flows or grants that can be supported by each UGS service flow—as defined by the applicable DOCSIS protocol. If the UGS service flow is already supporting the maximum number of sub flows, an additional sub flow cannot be added and the determination is made that an additional UGS service flow is required at step 660.

Alternatively, if both the existing UGS service flow can be used (step 654) and an additional sub flow can be added to the existing UGS service flow (step 656), then the determination is made that an additional sub flow may be added to the existing UGS service flow at step 658.

Returning to the ladder diagram of FIG. 15, if the existing UGS service flow can be used to support the media session of the VoIP call (determination at step 558 of FIG. 16), the DQoS control module 304 of the cable modem 300 initiates a DOC- SIS Dynamic Service Change request (DSC-REQ) to the CMTS 18 to add an additional sub flow to the UGS service flow as represented by step 422.

Alternatively, if the existing UGS service flow will not support the media session of the VoIP call (i.e. different service flow attributes and/or existing service flow is already at maximum number of sub flows), the DQoS control module 304 of the cable modem 300 initiates a Dynamic Service Change request (DSC-REQ) to the CMTS 18 to commit an additional UGS service flow at step 424 (i.e. commit the bandwidth reserved at step 410).

In response to either of the DSC-REQ message (i.e. add an additional sub flow to an existing service flow at step 422 or to commit a new UGS service flow at step 424) the CMTS returns and acknowledgment 425. Messages 422, 424, and 425 may be standard DOCSIS Mac layer messaging for reservation and change of dynamic service flows.

Upon detecting that either the VoIP device 12a has sent a SIP Bye message 426 to the Soft Switch 22 or that the Soft Switch 22 has sent a SIP Bye message 428 to the VoIP device 12a, the DQoS control module 304 of the cable modem 300: i) if the UGS service flow supporting the call includes multiple grants per interval, a DSC message to remove the sub flow from the UGS service flow to the CMTS 18; or ii) if the service flow supporting the call includes only a single grant, a bandwidth deletion or release message to the CMTS 18, in each case being represented by step 428.

In response, to message 428, the CMTS 18 may return an acknowledgment 429. Messages 428 and 429 may be standard DOCSIS Mac layer messaging for dynamic service flows.

Referring again to FIG. 4, the aspect of the invention related to multiple grants per interval technology may be implemented in the integrated cable modem/Session Border Controller system 300.

Figure 17:
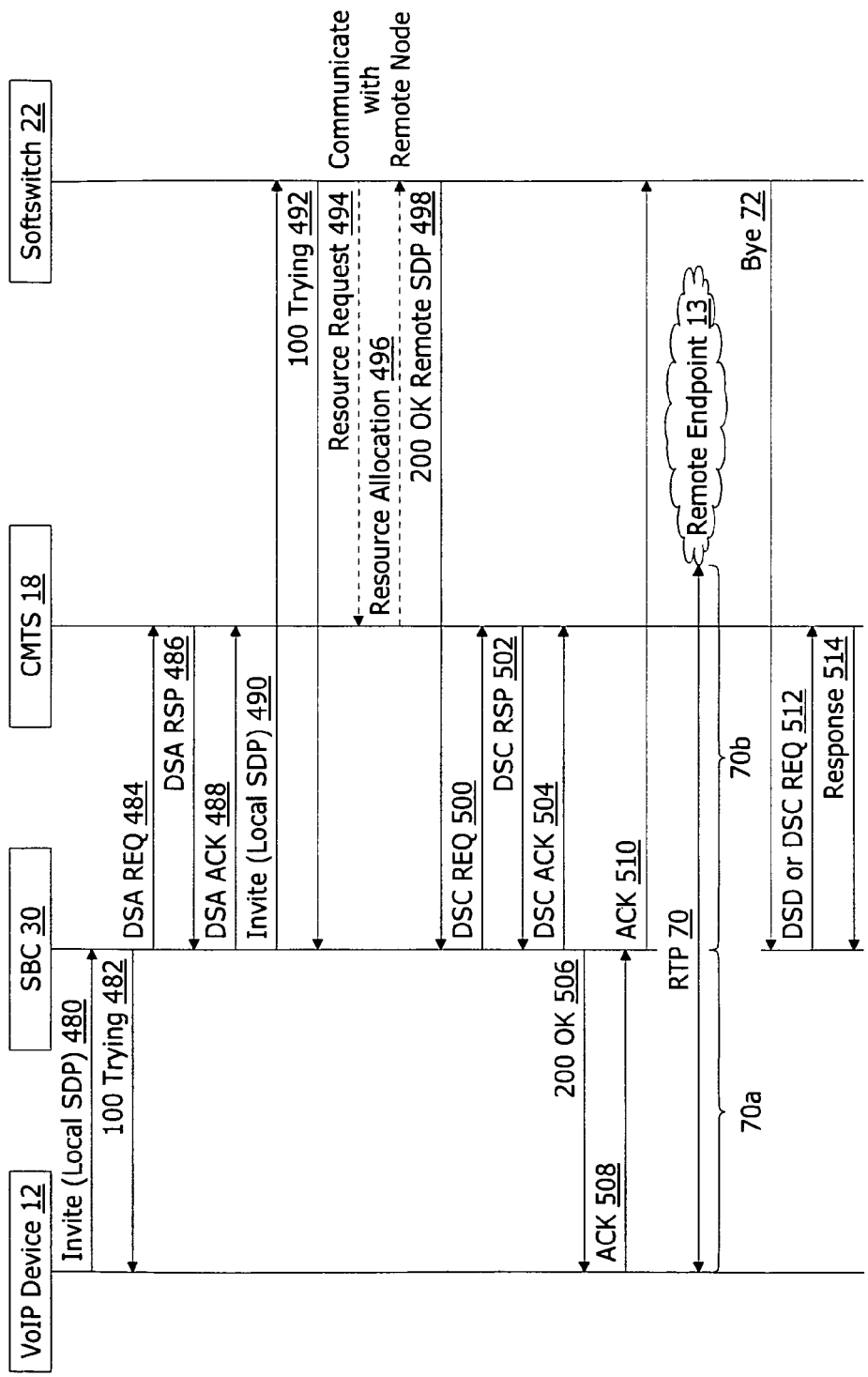
FIG. 17 is a ladder diagram representing signaling in accordance with a multiple grant per interval an aspect of the present invention.
Figure 18:
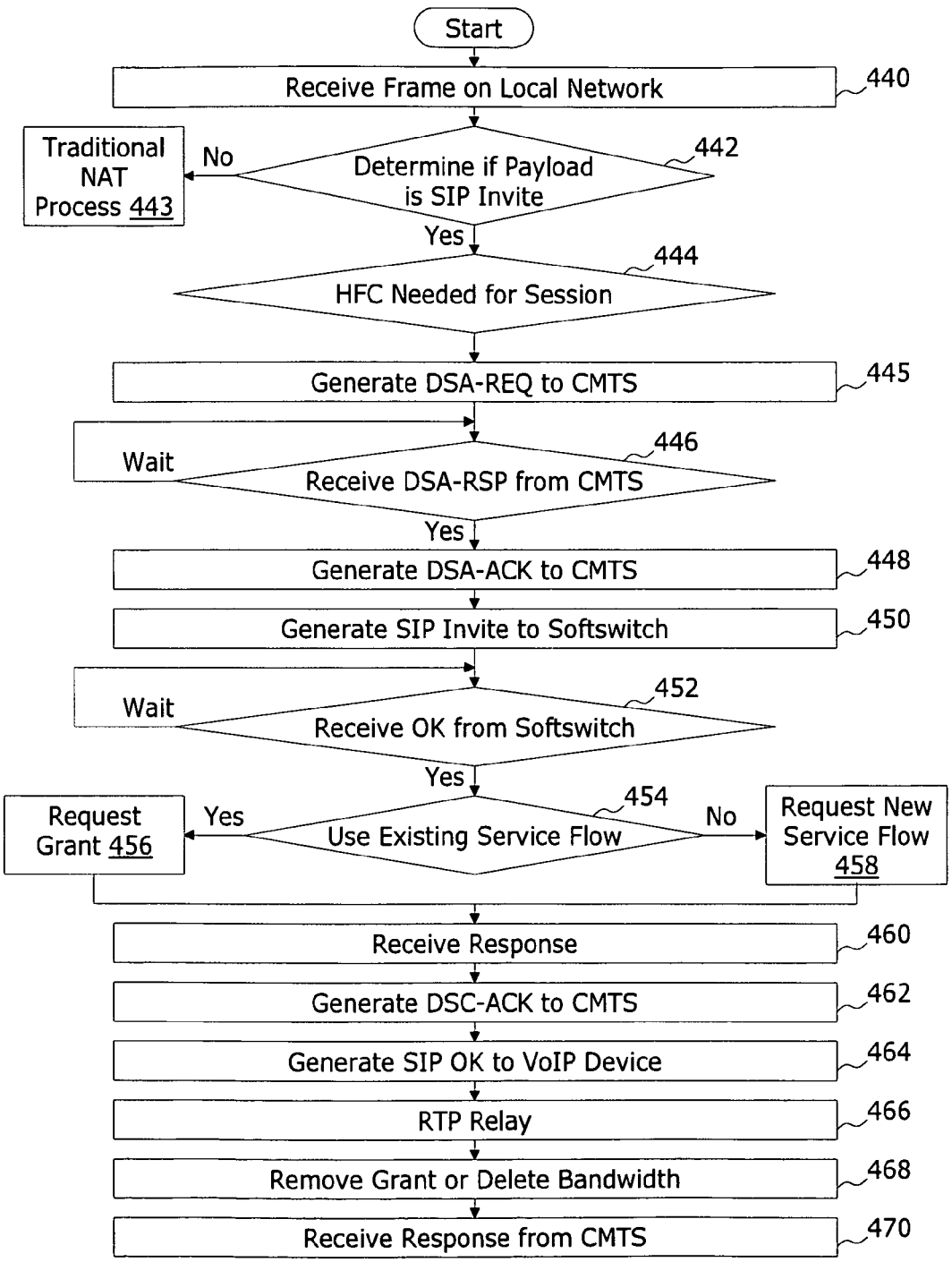
FIG. 18 is a flow chart representing exemplary operation of a session border controller in accordance with a multiple grants per interval aspect of the present invention.
Figure 19:
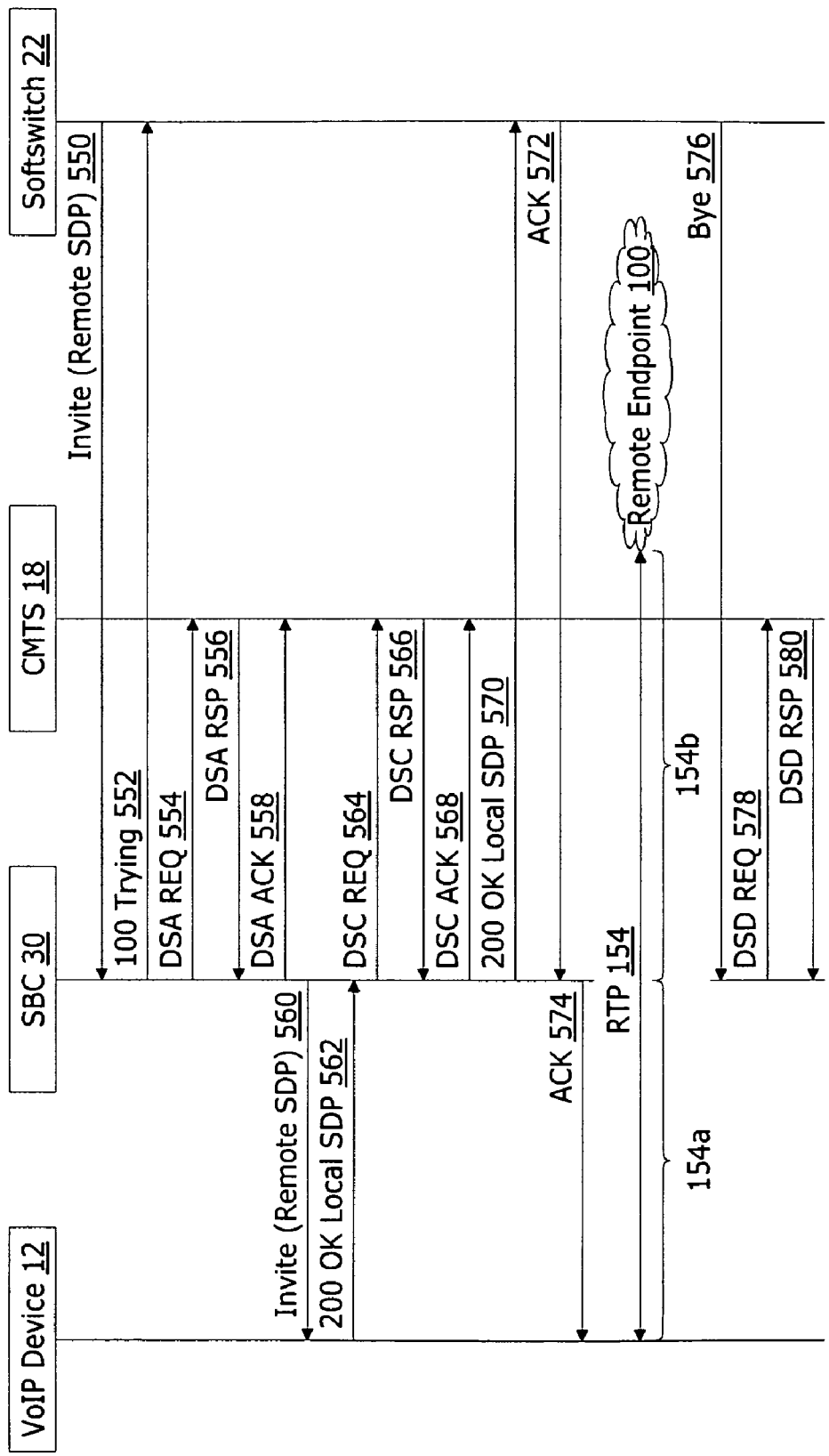
FIG. 19 is a ladder diagram representing signaling in accordance with a multiple grant per interval an aspect of the present invention.
Figure 20:
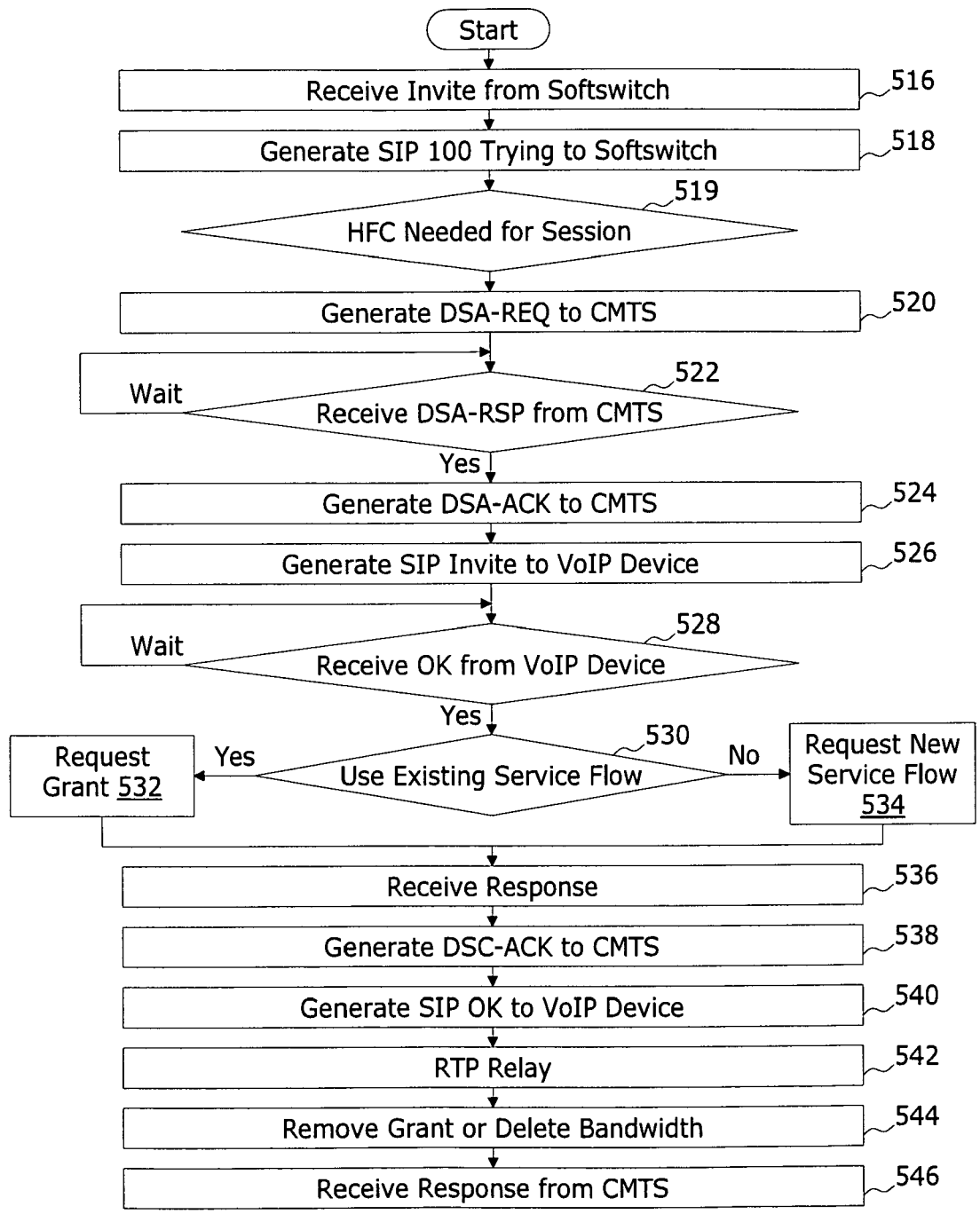
FIG. 20 is a flow chart representing exemplary operation of a session border controller in accordance with a multiple grants per interval aspect of the present invention.

More specifically, referring to the ladder diagrams of FIGS. 17 and 19 in conjunction with the flow charts of FIGS. 18 and 20 and the block diagram of FIG. 4, an aspect of the invention is represented wherein the DQoS module 30, and more specifically, the application layer gateway (ALG) function, further implements multiple grants per interval technology in a situation wherein multiple VoIP devices 12a and 12b are present on the LAN 14, each of which is capable of establishing and maintaining a VoIP session with other devices on the same LAN or other devices coupled to the Internet 20 (or remote subnets). For purposes of illustrating this aspect of the invention, it is assumed that VoIP device 12b has an active VoIP media session, utilizing a DQoS service flow on the HFC network 16, with a remote endpoint which was set up as described in this application.

FIG. 17 is a ladder diagram which represents signaling to set up an outbound RTP stream (i.e. and RTP stream initiated by the VoIP device 12a on the LAN 14) and the flow chart of FIG. 18 represents processing steps performed by the SBC 26 to initiate, receive, and otherwise perform such signaling as well as obtain DQoS allocation and commitment of resources and/or request an additional service flow to be added to an existing UGS service flow to support the RTP stream.

Referring to FIG. 18 in conjunction with FIG. 17, step 440 of the flow chart represents the SBC 26 receiving an IP frame 33 (FIG. 9) with a payload comprising a SIP Invite message 480.

The frame 33 is transmitted by the VoIP device 12a to the SBC 30 via the local area network 14 (FIG. 4)—which implicitly includes routing of the IP frame by the LAN System 24 to the CM/SBC operating as a gateway.

Although the ladder diagram of FIG. 17 represents a SIP invite message 480, the SBC also receives frames with payload other than a SIP invite message, for example frames with payloads of data from a data device 15 (FIG. 4). As such, step 442 of the flow chart represents the SBC 26 determining whether the frame 33 includes a SIP invite message 480 for example by comparing the payload 37 of the frame to characteristics of a SIP invite message.

If the frame 33 includes payload 37 other than a SIP invite message (or other SIP signaling), it may undergo traditional IP address and port translation by the NAT 27 for routing on the Internet as represented by step 443.

If the frame 33 includes payload 37 which is a SIP invite message, step 444 represents determining whether the session will require bandwidth on the HFC network 16. Again, this determination may require determining whether both the VoIP device 12 and the remote VoIP device with which the session will take place are both on the LAN 14. If yes, the VoIP session will not require use of the HFC network and reservation and commitment of bandwidth (i.e. establishing a DOCSIS service flow will not be needed).

If the frame 33 includes payload 37 that is a SIP Invite message 480 and a session on the HFC network 16 will be required, the DQoS module 30 (FIG. 4) of the SBC 26, in response to determining that the frame 33 includes a SIP invite message 480 and in response to determining that a session on the HFC network 16 will be required, may generate a dynamic services addition request (DSA-REQ) message 484 to the CMTS 18 as represented by step 445 of the flow chart. The local user agent half 28a of the B2BUA 28 may also send a SIP 100 Trying message 482 to the local VoIP device 12.

Step 446 of the flow chart represents the SBC 26 waiting to receive, and receiving, a dynamic services addition response (DSA-RSP) message 486 from the CMTS 18.

In response to receiving the DSA-RSP 486, the SBC 26 generates a dynamic services addition acknowledge (DSA-ACK) message 488 to the CMTS 18 as represented by step 488 of the flow chart.

Each of the DSA-REQ 484, the DSA-RSP 486, and the DSA-ACK 488 may be COPS messages with the DQoS module operating as the PDP for the VoIP device 12a and the CMTS operating as the PEP.

Also in response to receiving the DSA-RSP 486, and only after receiving the DSA-RSP 486, the public user agent half 28b of the B2BUA 28 of the SBC 26 generates a IP frame 43 (FIG. 10) with a payload 47 (FIG. 10) comprising a corresponding SIP Invite message 490 (FIG. 17) to the Soft Switch 22 as represented by step 450 of the flow chart.

Referring briefly to FIG. 10, the frame 43 includes an IP header 45 which specifies a source IP address and port number of the SBC 30 (i.e. the CM/SBC public IP address assigned by the Internet Service Provider) and a destination IP address and port number of the Soft Switch 22. The payload 47 of the frame 43 includes the corresponding SIP invite message 490. The corresponding SIP invite message 490 includes specification of: i) the local Session Description Protocol (SDP) of the B2BUA 28 of the SBC system 25; and ii) the SIP Address of the remote (i.e. intended) destination endpoint VoIP device 13.

The frame 43 with the corresponding SIP Invite message 490 is transmitted by the B2BUA 28 to the Soft Switch 22 via the HFC network 16 and the network 20 as represented by step 450.

In response to receiving the corresponding SIP Invite message 490, the Softswitch 22 may generate a SIP 100 Trying message 492 back to the B2BUA 28, communicate the a remote node such as a proxy server supporting the remote endpoint 13 to obtain a remote SDP of the remote endpoint 13, and, if needed obtain allocation of bandwidth for the remote endpoint by, for example, requesting recourse allocation from a CMTS 18 (message 494) and obtaining allocation (message 496). These steps are useful in a system wherein a CMTS will not allocate bandwidth to a cable modem unless a gate ID has been assigned by the CMTS. Requesting and obtaining resource allocation includes obtaining a gate ID to return to the B2BUA.

Returning to the flow chart, step 452 represents the B2BUA 28 waiting for, and receiving a SIP 200 OK message 498 with a remote SDP from the Soft Switch 22.

In response to receiving the SIP 200 OK message 498, the DQoS module 30 of the SBC 26 determines whether an existing DQoS service flow (for example the service flow in use for a media session of a VoIP call between VoIP device 12*b* and a remote endpoint) may be used for the commencing media session between the VoIP device 12*a* and the remote VoIP device 13. More specifically, and with brief reference to FIG. 10, the Session Description Protocol (SDP) parameters of the commencing call as set forth in the corresponding SIP Invite 490 may be used to determine the existing UGS service flow can be used by utilizing the process described with respect to FIG. 16.

If the existing UGS service flow can be used to support the media session of the VoIP call, the DQoS control module 30 initiates a DOCSIS Dynamic Service Change request (DSC-REQ) 500 to the CMTS 18 at step 456 to add an additional sub flow to the existing UGS service flow.

Alternatively, if an existing UGS service flow will not support the media session of the VoIP call (i.e. different service flow attributes and/or the existing service flow is already at the maximum quantity of sub flows), the DQoS control module 30 generates a dynamic services change request (DSC-REQ) message 500 to the CMTS 18 to add an additional UGS service flow to support the media session of the VoIP call as represented by step 458 of the flow chart (i.e. to commit the bandwidth reserved at step 444).

In either case, the additional sub flow or the new service flow would only be requested after receiving the SIP 200 OK message 498.

In either case, step 460 of the flow chart represents the SBC 26 waiting to receive, and receiving, a dynamic services change response (DSC-RSP) message 502 from the CMTS 18.

In response to receiving the DSC-RSP 502, and only after receiving the DSC-RSP 502, the DQoS module 30 generates a dynamic services change acknowledge (DSC-ACK) message 504 to the CMTS as represented by step 462 of the flow chart and the local user agent half 28*a* of the B2BUA 28 generates a 200 SIP OK message 506 to VoIP device 12*a* via the local area network 14 as represented by step 464 of the flow chart.

Thereafter, after appropriate acknowledge messages, at least some of which are represented on the ladder diagram by reference numerals 508 and 510, the real time protocol (RTP) stream 70 is commenced.

The RTP stream 70 comprises at least a first segment 70*a* and a second segment 70*b*. The first segment 70*a* is a RTP stream between the VoIP device 12*a* and a local user agent half 28*a* of the B2BUA 28 using the SDP of the VoIP device and the SDP of the local user agent half 28*a* of the B2BUA 28. The second segment 70*b* represents an RTP stream between a public user agent half 28*b* of the B2BUA 28 and the remote VoIP device 13 using the SDP of the public user agent half 28*b* of the B2BUA 28 and the SDP of the VoIP device 13.

Thereafter, in response to the B2BUA receiving a SIP Bye message, the committed bandwidth on the HFC network 16 is release by the DQoS module 30 transmitting: i) if, after releasing the sub flow within the UGS service flow supporting the RTP session 70*b*, at least one other sub flow would remain, then by transmitting a DSC-REQ to remove the grant supporting the RTP stream 70*b*; and ii) if, the sub flow supporting the RTP stream is the only remaining sub flow in the service flow, then by transmitting a dynamic services deletion request (DSD-REQ) message to the CMTS 18 (each message is represented by 512) as represented by step 468 of the flow chart and CMTS returning a dynamic service deletion response (DSD-RSP) message 580 for receipt by the DQoS module 30 as represented by step 470.

The optional steps of obtaining a gate ID as described with respect to FIG. 13 and FIG. 14 apply to this aspect of the invention as described with respect to FIG. 17 and FIG. 18.

FIG. 19 is a ladder diagram representing signaling to set up an inbound RTP stream (i.e. and RTP stream initiated by a remote VoIP device, such as device 13, to the VoIP device 12*a* on the LAN 14) using multiple grants per interval technology and the flow chart of FIG. 20 represents steps performed by the SBC 26 to initiate, receive, and otherwise perform such signaling.

Referring to FIG. 20 in conjunction with FIG. 19, step 516 of the flow chart represents the SBC 30 receiving an IP frame 190 (FIG. 11) with a payload comprising a SIP Invite message 550.

In response to receiving the SIP Invite: i) the public user agent half 28*b* of the B2BUA 28 generates a SIP 100 trying message 552 to the Soft Switch 22 as represented by step 518 of the flow chart; and ii) the DQoS module 30 (FIG. 4) of the SBC 26 determines whether the session will require bandwidth on the HFC network 16 at step 519. This determination may require determining whether both the VoIP device 12 and the remote VoIP device with which the session will take place are both on the LAN 14. If yes, the VoIP session will not require use of the HFC network and reservation and commitment of bandwidth (i.e. establishing a DOCSIS service flow will not be needed). If the session will require bandwidth on the HFC network 16, the DQoS module 30 of the SBC 26 generates a dynamic services addition Request (DSA-REQ) message 554 to the CMTS 18 as represented by step 520 of the flow chart.

Step 522 of the flow chart represents the SBC 26 waiting to receive, and receiving, a dynamic services addition response (DSA-RSP) message 556 from the CMTS 18.

In response to receiving the DSA-RSP 556, the SBC 26 generates a dynamic services addition acknowledge (DSA-ACK) message 558 to the CMTS 18 as represented by step 524 of the flow chart.

Again, each of the DSA-REQ 554, the DSA-RSP 556, and the DSA-ACK 558 may be COPS messages with the DQoS module 30 operating as the PDP for the VoIP device 12*a* and the CMTS operating as the PEP.

Also in response to receiving the DSA-RSP 556, and only after receiving the DSA-RSP 556, the local user agent half 28*a* of the B2BUA 28 generates an IP frame 193 (FIG. 12) with a payload 194 comprising a corresponding SIP Invite message 560 (FIG. 6) to the VoIP device 12*a* as represented by step 526 of the flow chart.

Step 528 represents the B2BUA 28 waiting for, and receiving a SIP 200 OK message 562 with a Session Description Protocol (SDP) from the local VoIP device 12*a*.

In response to receiving the SIP 200 OK message 562 the DQoS module 30 of the SBC 26 determines whether an existing DQoS service flow (for example the service flow in use for a media session of a VoIP call between VoIP device 12*b* and a remote endpoint) may be used for the commencing media session between the VoIP device 12*a* and the remote VoIP device 13, as represented by step 530 of the flow chart. More specifically, and with brief reference to FIG. 12, the Session Description Protocol (SDP) parameters of the commencing call as set forth in the SIP Invite 550 may be used to determine whether the existing UGS service flow can be used in accordance with the process described with respect to FIG. 16.

If the existing UGS service flow can be used to support the media session of the VoIP call, the DQoS control module 30 initiates a DOCSIS dynamic service change request (DSC-REQ) message 564 to the CMTS at step 532 to add an additional sub flow to the existing UGS service flow.

Alternatively, if an existing UGS service flow will not support the media session of the VoIP call (i.e. different service flow attributes and/or the existing service flow is already at the maximum number of sub flows), the DQoS control module 30 generates a dynamic services change request (DSC-REQ) message 564 to the CMTS 18 to add an additional UGS service flow to support the media session of the VoIP call as represented by step 534.

In either case, the additional grant or the new service flow would only be requested after receiving the SIP 200 OK message 562.

In either case, step 536 of the flow chart represents the SBC 26 waiting to receive, and receiving, a dynamic services change response (DSC-RSP) message 566 from the CMTS 18.

In response to receiving the DSC-RSP 566, and only after receiving the DSC-RSP 566, the DQoS module 30 generates a dynamic services change acknowledge (DSC-ACK) message 568 the CMTS as represented by step 538 of the flow chart and the B2BUA 28 generates a 200 SIP OK message 570 to the Soft Switch 22 as represented by Step 540 of the flow chart.

Thereafter, after appropriate acknowledge messages, at least some of which are represented on the ladder diagram by reference numerals 572 and 574, the real time protocol (RTP) stream 154 is commenced.

The RTP stream 154 comprises at least a first segment 154*a* and a second segment 154*b*. The first segment 154*a* is a RTP stream between the VoIP device 12*a* and a local user agent half 28*a* of the B2BUA 28 using the SDP of the VoIP device and the SDP of the local user agent half 28*a* of the B2BUA 28. The second segment 154*b* represents a RTP stream between a public user agent half 28*b* of the B2BUA 28 and the remote VoIP device 13 using the SDP of the public user agent half 28*b* of the B2BUA 28 and the SDP of the VoIP device 13.

Thereafter, in response to the B2BUA receiving a SIP Bye message 576, the committed bandwidth on the HFC network 16 is release by the DQoS module 30 transmitting: i) if, after releasing the sub flow of the UGS service flow supporting the RTP session 154*b*, at least one other sub flow would remain, then by transmitting a DSC-REQ to remove the sub flow supporting the RTP stream 1541*a*, and ii) if, the sub flow supporting the RTP stream is the only remaining sub flow in the service flow, then by transmitting a dynamic services deletion request (DSD-REQ) message to the CMTS 18 (each message is represented by 578) as represented by step 544 of the flow chart and CMTS returning a dynamic service deletion response (DSD-RSP) message 580 for receipt by the DQoS module 30 as represented by step 546.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A Data-Over-Cable Service Interface Specification (DOCSIS) cable modem system coupled to:
   via a local area internet protocol (IP) network, a voice over internet protocol (VoIP) device operating Session Initiation Protocol (SIP) for signaling a VoIP media session; and
   via a DOCSIS network, a cable modem termination system (CMTS) via a network;
   the cable modem system comprising instructions stored in a memory and executed by a processor, the instructions comprising:
   in response to receiving a frame via the local area IP network, the frame being a Session Initiation Protocol (SIP) message which includes identification of a compression protocol to be used for compressing digital audio of a real time protocol (RTP) stream of a VoIP session between the VoIP device and a remote endpoint:
      using the identified compression protocol to determine required service flow attributes, the required service flow attributes including a grant size and grant interval necessary for supporting the RTP stream;
      determining if the required service flow attributes match service flow attributes of an existing unsolicited grant (UGS) of a VoIP media session service flow between the cable modem and the CMTS;
   in response to both: i) determining that the required service attributes match service flow attributes of an existing UGS service flow between the cable modem and the CMTS; and ii) receiving a frame via the local area IP network, the frame being a SIP OK message to initiate the real time protocol stream of the VoIP session between the VoIP device and the remote endpoint; generating a DOCSIS Dynamic Service Change (DSC) request to add an additional sub flow to the existing UGS service flow to support the RTP stream of the VoIP session between the VoIP device and the remote endpoint; and
   in response to: i) determining that the required service attributes are different from service flow attributes of all existing UGS service flows between the cable modem and the CMTS; and ii) receiving a frame via the local area IP network, the frame being a SIP OK message to initiate the real time protocol stream of the VoIP session between the VoIP device and the remote endpoint; generating a DOCSIS Dynamic Service Change (DSC) request to initiate an additional UGS service flow with the required service flow attributes to support the RTP stream of the VoIP session between the VoIP device and the remote endpoint.

2. The DOCSIS cable modem of claim 1, wherein the instructions further comprise:
   in response to receiving a frame via the local area IP network, determining if the frame is a Session Initiation Protocol (SIP) BYE message signing termination of a real time protocol (RTP) stream between the VoIP device and the remote endpoint;
   in response to both: i) determining that the frame is a SIP Bye message, and ii) determining that the UGS service flow supporting the RTP stream is supporting at least one additional RTP stream, generating a DOCSIS Dynamic Service Change (DSC) request to remove the sub flow supporting the RTP stream from the UGS service flow; and in response to both: i) determining that the frame is a SIP Bye message, and ii) determining that the UGS service flow supporting the RTP stream is supporting no other RTP streams, generating a DOCSIS Dynamic Service Deletion (DSD) request to terminate the UGS service flow.

3. A cable modem integrated session boarder control circuit coupled to:

a voice over internet protocol (VoIP) device via a local area network; and a cable modem circuit (CM) for communication with a cable modem termination system (CMTS) via a Data-Over-Cable Service Interface Specification (DOCSIS) network;

the session boarder control circuit comprising instructions stored in a memory and executed by a processor, the instructions comprising:

in response to receiving a frame via the local area IP network, the frame being a Session Initiation Protocol (SIP) message which includes identification of a compression protocol to be used for compression digital audio of a real time protocol (RTP) stream of a VoIP session between the VoIP device and a remote endpoint:

using the identified compression protocol to determine required service flow attributes, the required service flow attributes including a grant size and grant interval necessary for supporting the RTP stream;

determining if the required service flow attributes match service flow attributes of an existing unsolicited grant (UGS) of a VoIP media session service flow between the cable modem and the CMTS;

in response to both: i) determining that the required service attributes match service flow attributes of an existing UGS service flow between the cable modem and the CMTS; and ii) receiving a frame via the local area IP network, the frame being a SIP OK message to initiate the real time protocol stream of the VoIP session between the VoIP device and the remote endpoint; generating a DOCSIS Dynamic Service Change (DSC) request to add an additional sub flow to the existing UGS service flow to support the RTP stream of the VoIP session between the VoIP device and the remote endpoint; and in response to: i) determining that the required service attributes are different from service flow attributes of all existing UGS service flows between the cable modem and the CMTS; and ii) receiving a frame via the local area IP network, the frame being a SIP OK message to initiate the real time protocol stream of the VoIP session between the VoIP device and the remote endpoint; generating a DOCSIS Dynamic Service Change (DSC) request to initiate an additional UGS service flow with the required service flow attributes to support the RTP stream of the VoIP session between the VoIP device and the remote endpoint.

4. The cable modem integrated session boarder control circuit of claim 3, wherein the instructions further comprise:

in response to receiving a frame via the local area IP network, determining if the frame is a Session Initiation Protocol (SIP) BYE message signing termination of a real time protocol (RTP) stream between the VoIP device and the remote endpoint;

in response to both: i) determining that the frame is a SIP Bye message, and ii) determining that the UGS service flow supporting the RTP stream is supporting at least one additional RTP stream, generating a DOCSIS Dynamic Service Change (DSC) request to remove the sub flow supporting the RTP stream from the UGS service flow; and in response to both: i) determining that the frame is a SIP Bye message, and ii) determining that the UGS service flow supporting the RTP stream is supporting no other RTP streams, generating a DOCSIS Dynamic Service Deletion (DSD) request to terminate the UGS service flow.

* * * * *